(12) United States Patent
Li et al.

(10) Patent No.: US 10,178,711 B2
(45) Date of Patent: Jan. 8, 2019

(54) REAL-TIME RELAY OF WIRELESS COMMUNICATIONS

(71) Applicant: APPLE INC., Cupertino, CA (US)

(72) Inventors: Lei Li, Sunnyvale, CA (US); Xiaojun Chen, San Jose, CA (US); Vusthla Sunil Reddy, Cupertino, CA (US); Peter M. Agboh, Burlingame, CA (US); Mohit Narang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/708,584

(22) Filed: Sep. 19, 2017

(65) Prior Publication Data

US 2018/0084606 A1    Mar. 22, 2018

Related U.S. Application Data

(60) Provisional application No. 62/397,675, filed on Sep. 21, 2016.

(51) Int. Cl.
| | |
|---|---|
| *H04W 84/18* | (2009.01) |
| *H04W 88/04* | (2009.01) |
| *H04L 5/00* | (2006.01) |
| *H04W 72/08* | (2009.01) |
| *H04W 72/04* | (2009.01) |
| *H04W 88/06* | (2009.01) |
| *H04W 4/80* | (2018.01) |
| *H04L 1/00* | (2006.01) |

(52) U.S. Cl.
CPC .......... *H04W 88/04* (2013.01); *H04L 5/0055* (2013.01); *H04W 72/085* (2013.01); *H04W 84/18* (2013.01); *H04L 2001/0097* (2013.01); *H04W 4/80* (2018.02); *H04W 72/0446* (2013.01); *H04W 88/06* (2013.01)

(58) Field of Classification Search
CPC ........................... H04W 72/085; H04W 88/04
See application file for complete search history.

(56) References Cited

U.S. PATENT DOCUMENTS 8,768,252 B2 *  7/2014  Watson .................... H04R 5/02
                                                        455/41.2

* cited by examiner

*Primary Examiner* — Tuan H Nguyen
(74) *Attorney, Agent, or Firm* — Fay Kaplun & Marcin, LLP

(57) ABSTRACT

Exemplary embodiments include a system having a first wireless audio output device and a second wireless audio output device. One of the first or second audio output devices is configured to one of connect as a slave to a source device in a first piconet and connect as a master to the other one of the first or second audio output devices in a second piconet. The one of the first or second wireless audio output devices determines whether an audio packet transmitted by the source device via the first piconet was received by the first wireless audio output device and the second wireless audio output device, and, when at least one of the first wireless audio output device or the second wireless audio output device did not receive the audio packet, the audio packet is exchanged between the first and second wireless audio output devices via the second piconet.

20 Claims, 17 Drawing Sheets

Table 200

Example of B2B link packet type and payload

| Packet Type | Percentage used In typical B2B link | B2B Payload (bytes) | |
|---|---|---|---|
| | | Average | Max |
| NULL | 49% | 0 | 0 |
| POLL | 44% | 0 | 0 |
| ID | 3% | 0 | 0 |
| 2-DH1 | 4% | 33 | 38 |

Graph 300

A scheduling conflict example. BT packet vs time slot

104 — Bud-to-Bud
102 — Source-to-Bud

| | Source-to-sink Tx slot length and rate | | | | | | | | | | |
|---|---|---|---|---|---|---|---|---|---|---|---|
| | 1-slot | 3-slot | | | | | | 5-slot (ACL) | | | |
| | | eSCO | | | ACL | | | | | | |
| Max source packet payload supporting Real-time relay (bytes) \ Relay link rate | Any rate | 1 Mbps | 2 Mbps | 3 Mbps | 1 Mbps | 2 Mbps | 3 Mbps | 1 Mbps | 2 Mbps | 3 Mbps |
| 1 Mbps | N/A | 74 | 99 | 111 | 74 | 98 | 111 | 152 | 202 | 228 |
| 2 Mbps | N/A | 99 | 148 | 178 | 99 | 147 | 177 | 203 | 303 | 365 |
| 3 Mbps | N/A | 112 | 178 | 224 | 111 | 177 | 223 | 229 | 365 | 457 |

Real-time relay supported maximum BT source packet payload size*
(based on link rates and source Tx slot length)

Table 1700

F I G. 17

REAL-TIME RELAY OF WIRELESS COMMUNICATIONS

PRIORITY/INCORPORATION BY REFERENCE

This application claims priority to U.S. Provisional Application 62/397,675 entitled "Apparatus, Systems and Methods for a Real-time Relay of Wireless Communications," filed on Sep. 21, 2016, the entirety of which is incorporated herein by reference.

BACKGROUND

Wireless communication systems are rapidly growing in both usage and the number of connected devices. A personal area network ("PAN") may be defined as a computer network used for data transmission amongst devices such as computers, telephones, tablets, personal digital assistants, wearables, Internet of Things (IoT) devices, etc. For instance, a PAN may be used for communication between the devices themselves (e.g., interpersonal communication), or for connecting one or more devices to a higher level network and the Internet via an uplink, wherein one "master" device takes up the role as internet router. Furthermore, a wireless PAN is a network for interconnecting devices wherein the connections are wireless, using wireless technologies, such as Bluetooth.

A piconet consists of two or more devices occupying the same physical channel (e.g., synchronized to a common clock and hopping sequence). Typically, a piconet allows for one master (or primary) device to interconnect with up to seven active slave (or secondary) devices. For instance, examples of piconets include a cell phone connected to a computer, a laptop and a Bluetooth-enabled digital camera, or several tablet computers that are connected to each other.

When two or more independent, non-synchronized Bluetooth piconets overlap, a scatternet is formed in a seamless, ad-hoc fashion allowing for inter-piconet communication. In other words, a scatternet is a type of computer network consisting of two or more piconets, wherein a Bluetooth node may be a master in one piconet and a slave in one or more other piconets. Within a piconet having at least three devices, such as a source device acting as a master and two wireless audio devices as slaves, the two slaves may need to receive synchronization data from the master. However, a user may experience audio glitches if only one slave device receives audio packets while the other slave device has poor reception from the master. Accordingly, the audio quality and range of the piconet may be limited to the weaker of the two links of the slaves. Accordingly, a need exists for a real-time relay of wireless communications within a scatternet.

SUMMARY

Some exemplary embodiments are directed to a method performed by a first wireless audio output device configured as a slave to a source device in a first piconet and configured as a master to a second wireless audio output device in a second piconet. The method includes determining whether an audio packet transmitted by the source device via the first piconet was successfully received by the first wireless audio output device and the second wireless audio output device, when the first wireless audio output device or the second wireless audio output device did not successfully receive the audio packet, exchanging data with the second wireless audio output device via the second piconet such that the first wireless audio output device and the second wireless audio output device both receive the audio packet.

Some other exemplary embodiments are directed to a first wireless audio output device including a transceiver configured to connect as a slave with a source device in a first piconet and connect as a master with a second wireless audio output device in a second piconet and a processor communicatively coupled to the transceiver and configured to determine whether an audio packet transmitted by the source device via the first piconet was successfully received by the first wireless audio output device and the second wireless audio output device. When at least one of the first wireless audio output device or the second wireless audio output device did not successfully receive the audio packet, the processor is configured to cause the first wireless audio device to exchange data with the second wireless audio output device via the second piconet, such that the first wireless audio output device and the second wireless audio output device receive the audio packet.

Still other exemplary embodiments are directed to a system having a first wireless audio output device and a second wireless audio output device. One of the first or second audio output devices is configured to one of connect as a slave to a source device in a first piconet and connect as a master to the other one of the first or second audio output devices in a second piconet. The one of the first wireless audio output device or the second wireless audio output device determines whether an audio packet transmitted by the source device via the first piconet was successfully received by the first wireless audio output device and the second wireless audio output device, and when at least one of the first wireless audio output device or the second wireless audio output device did not successfully receive the audio packet, the audio packet is exchanged between the first wireless audio output device and the second wireless audio output device via the second piconet.

BRIEF DESCRIPTION OF THE DRAWINGS

FIG. 17 shows an exemplary table for real-time relay supported maximum Bluetooth source packet payload sizes based on link rates and slot length for the source transmission, according to various embodiments described herein.

DETAILED DESCRIPTION

Figure 1:
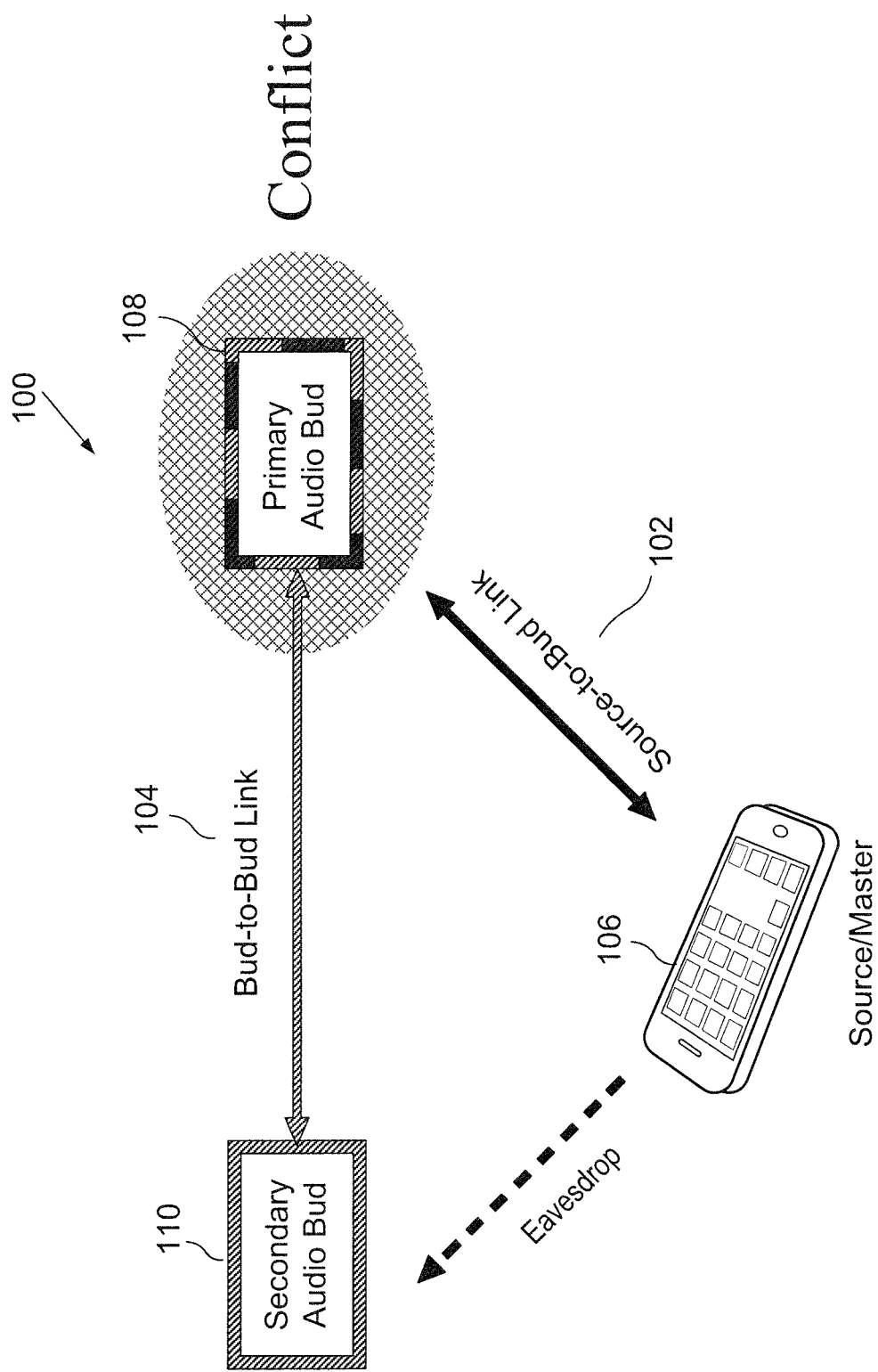
FIG. 1 shows an exemplary embodiment of a scatternet including two piconets and for use in wireless audio headphones according to various embodiments described herein.

The exemplary embodiments may be further understood with reference to the following description and the appended drawings, wherein like elements are referred to with the same reference numerals. The exemplary embodiments describe an apparatus, system and method for mitigating scheduling conflicts in wireless communication devices within a scatternet. It should be noted that while the exemplary embodiments described herein refer to scheduling conflicts in a Bluetooth scatternet, any type of network may implement the systems and methods described herein, and thus the various embodiments are not limited to a Bluetooth scatternet or piconets in general. Furthermore, while exemplary embodiments described herein may relate to a scatternet for use with wireless audio headphones (e.g., wireless earbuds), the systems and methods may be applied to connecting any wireless device and is not limited to wireless audio headphones.

Those skilled in the art will understand that the current methodology for establishing multiple piconets normally schedules the devices independently from one another. In other words, the scheduling between multiple piconets is not coordinated and may lead to scheduling conflicts between the connected devices. These scheduling conflicts may result in packet drops, retransmissions resulting in glitches, increased bandwidth usage, and general degradation of performance of both the network and the connected devices. In the exemplary embodiments that describe wireless audio buds, these packet drops, glitches, etc., may result in an unsatisfactory audio experience for the user.

FIG. 1 shows an exemplary embodiment of a scatternet 100 including two piconets 102 and 104 for use with two wireless audio headphones 108, 110 (e.g., wireless audio buds) in communication with a source device 106 (e.g., a mobile phone). The first piconet 102 is a source-to-bud ("S2B") piconet, wherein the source device 106 is the master and a primary audio bud 108 is a slave. The second piconet 104 is a bud-to-bud ("B2B") piconet, wherein the primary audio bud 108 is the master and a secondary audio bud 110 is a slave. In some implementations, one or more other devices also may be present in either or both of the first piconet 102 and the second piconet 104. It is noted that while the source device 106 may not be aware of the presence of the secondary audio bud 110, the secondary audio bud 110 may "eavesdrop" on the source device 106 as it communicates with the primary audio bud 108. Specifically, the secondary audio bud 110 may know the schedule for communications between the secondary audio bud 110 and the primary audio bud 108 on the B2B piconet 104. When there are no scheduled communications on the B2B piconet 104, the secondary audio bud 110 may eavesdrop on the communication between the source device 106 and the primary audio bud 108. Since it is generally assumed that the secondary audio bud 110 and the primary audio bud 108 will be in close physical proximity to each other, the secondary audio bud 110 may have generally the same (or in some cases, an even better) communication channel to listen to communications from the source device 106.

Figures 2, 3:
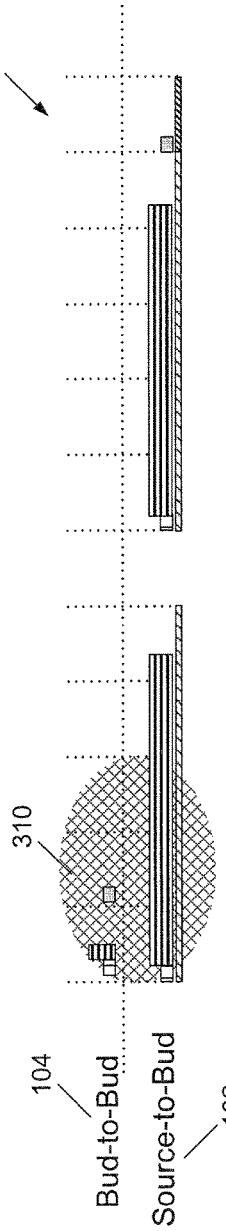
FIG. 2 shows an exemplary table for the packet types and payload of a bud-to-bud ("B2B") piconet for wireless audio headphones according to various embodiments described herein.
FIG. 3 shows show an exemplary graph of a scheduling conflict between a B2B piconet and a source-to-bud ("S2B") piconet for wireless audio headphones in communication with a source device according to various embodiments described herein.

The B2B piconet 104 may be used for audio synchronization and general control (e.g., battery life, adaptive frequency hopping ("AFH") map updates, etc.) between the two audio buds 108 and 110. FIG. 2 shows an exemplary table 200 for the packet types and payload(s) of the B2B piconet 104. As illustrated in table 200, the packet types may include NULL packets, POLL packets, ID packets, and payload packets (e.g., 2-DH1 Bluetooth packets). The NULL and POLL packets may be characterized as short general control packets that utilize the greatest portion of the B2B link. Thus, as can be seen from the table 200, a great number of the packets exchanged over the B2B piconet 104 may have a small payload. As will be described in greater detail below, this characteristic of the B2B packets may be used to improve scheduling coordination between the B2B piconet 104 and the S2B piconet 102.

FIG. 3 shows an exemplary graph 300 of a scheduling conflict between the B2B piconet 104 and the S2B piconet 102 for the wireless audio buds 108, 110 in communication with the source device 106. Specifically, the graph 300 illustrates packet transmissions over time, wherein the highlighted portion 310 depicts the time in which conflicts may occur. That is, at the times within the highlighted portion 310, both the B2B piconet 104 and the S2B piconet 102 may have communications scheduled that may lead to a conflict between the B2B piconet 104 and the S2B piconet 102. As noted above, scheduling conflicts between the S2B piconet 102 and the B2B piconet 104 may cause Bluetooth audio packet drops and retransmissions, thereby resulting in audio glitches. When compared with a wired link between buds or headphones, the wireless B2B link may utilize a greater main link bandwidth and thereby can result in degraded overall performance.

According to the exemplary embodiments of the systems and methods described herein, multiple B2B link transmission schemes are proposed to avoid conflicting with S2B transmissions. These exemplary transmission schemes may include, but are not limited to, partial-slot schemes and full-slot-listen schemes, that utilize either S2B partial slots or S2B full slots, respectively, that do not occupy main link bandwidth (e.g., source link bandwidth). These exemplary schemes will be described in greater detail below, but may be described in general as using available time within the schedule of the S2B piconet 102 to schedule communications for the B2B piconet 104. The time in the schedule of the S2B piconet 102 may be separated into multiple time slots and thus, the exemplary schemes are termed "slot" schemes because the schemes use one or more of these slots in the S2B piconet 102 schedule. Using available time in the S2B piconet 102 schedule (e.g., time when there are no communications scheduled for the S2B piconet 102) for B2B piconet 104 communications prevents scheduling conflicts between the two piconets 102 and 104.

Figure 4:
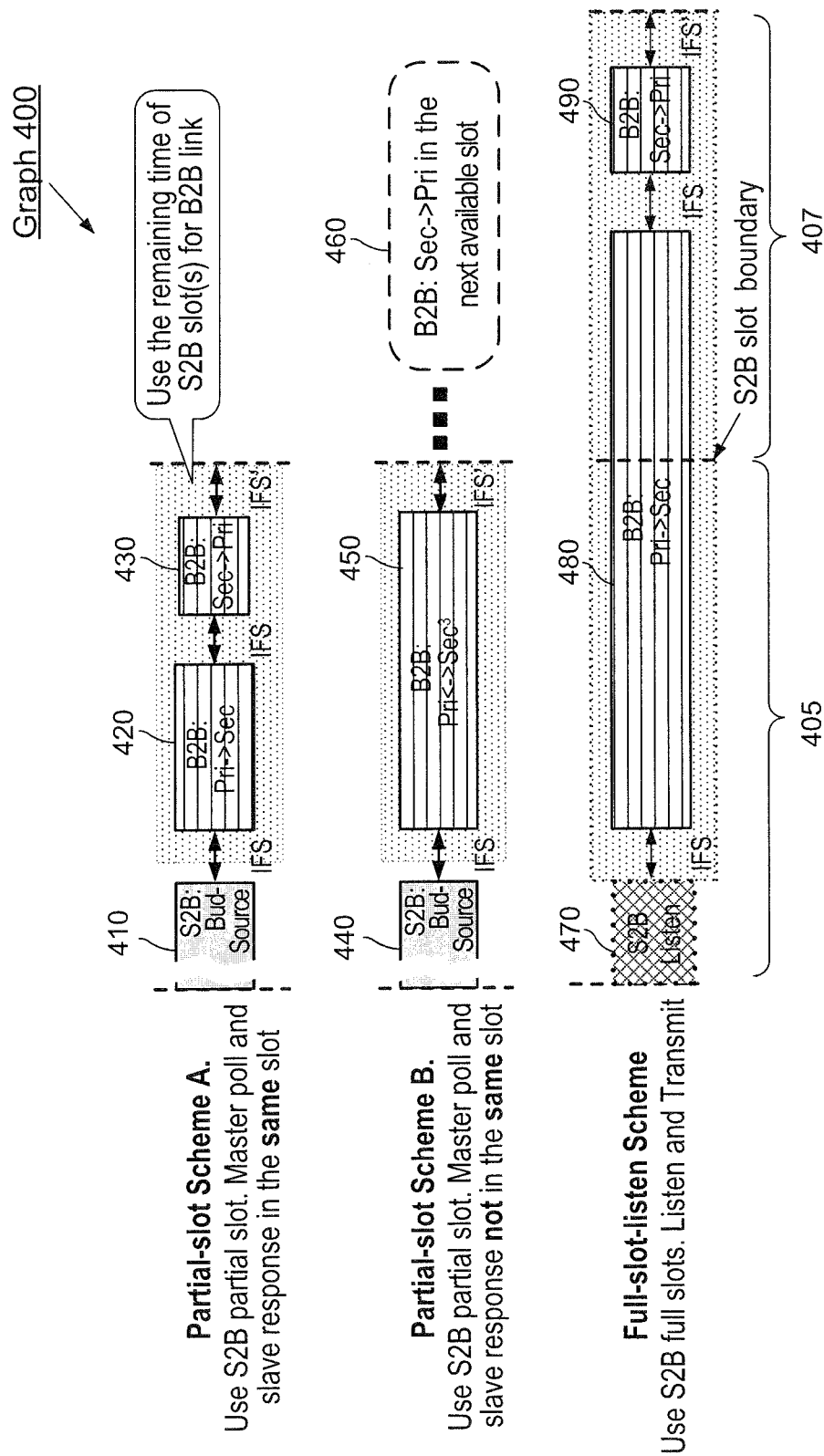
FIG. 4 shows a transmission graph using the various sub-schemes for partial slot and full-slot-listen according to various embodiments described herein.

FIG. 4 shows a transmission graph 400 using the various sub-schemes for partial slot and full-slot-listen, according to the exemplary embodiments described herein. It may be considered in graph 400 that two (2) S2B slots 405 and 407 are illustrated. Two of the exemplary partial-slot schemes may be referred to as Partial-slot Scheme A and Partial-slot Scheme B. According to the exemplary partial-slot operations, the B2B piconet 104 may use remaining time in the S2B slot(s) 405, 407 when transmission and reception with the source device 106 via the S2B piconet 102 is finished. The two Partial-slot Schemes A and B may be differentiated based on whether the B2B poll and response are included within the same partial slot(s). One skilled in the art would understand that the poll refers to the master to slave transmission (e.g., primary audio bud 108 to secondary audio bud 110 transmission) while the response refers to the slave to master transmission (e.g., secondary audio bud 110 to primary audio bud 108 transmission). As indicated in FIG. 4, the Partial-slot Scheme A may use an S2B piconet partial slot 405, incorporating the master poll 420 and slave response 430 in the same slot with inter-frame spacing ("IFS"). IFS may be defined as the time gap between frames for transmission/reception ("Tx/Rx") switching, baseband processing, etc. For example, the IFS may be a hardware constraint to allow the various hardware components of the primary audio bud 108 and the secondary audio bud 110 to tune from the S2B piconet 102 to the B2B piconet 104, switch between a transmission mode and a reception mode, etc. No communication should occur during this IFS to allow the hardware components to be set up properly to commence communications. Minimizing the IFS design (e.g., the time for IFS) may allow for communications to meet the maximum supported B2B payload requirements.

According to the transmission graph 400 of FIG. 4, the Partial-slot Scheme A allows for the available time in slot 405 after the S2B piconet communication 410 to include both the B2B communication 420 from primary audio bud 108 to the secondary audio bud 110, as well as the B2B communication 430 from secondary audio bud 110 to the primary audio bud 108. Accordingly, both of these the B2B communications 420 and 430 may be included in the same slot 405, using the available time of the S2B slot 405 for the B2B link.

The Partial-slot Scheme B may also use an S2B piconet partial slot, however the master poll and slave response are not included in the same slot. For instance, the available time in slot 405 following the S2B piconet communication 440 may include the B2B communication 450 from primary audio bud 108 to the secondary audio bud 110. However, the B2B communication 460 from secondary audio bud 110 to the primary audio bud 108 may take place in the next available slot. As will be described in greater detail below, the next available slot may or may not be the next slot 407. That is, the B2B communication 460 may occur in slot 407, but need not always occur in slot 407. Instead, in some instances, the B2B communication 460 may occur during a later slot. Accordingly, while these B2B communications 450 and 460 may use the available time of the S2B slot for communications on the B2B link, these B2B communications 450 and 460 do not reside in the same slot.

In contrast to either of the Partial-slot Schemes, the exemplary Full-slot Scheme may use S2B full slots to listen and transmit communications. For instance, a B2B communication 480 may initiate listen up until a header portion of the S2B communication 470 to determine if the B2B communication 480 may use the remaining portion of the S2B slot 405. The B2B communication 480 may also determine whether it may use the next S2B slot 407, as well, if the source device 106 does not use it (e.g., for polling the audio buds 108 and 110). Accordingly, the B2B communication 480 may opportunistically utilize both the remaining portion of the S2B slot 405 and a further portion of the following S2B slot 407 for the communication from the primary audio bud 108 to the secondary audio bud 110. The following S2B slot 407 may also include the B2B communication 490 from secondary audio bud 110 back to the primary audio bud 108.

It should be noted that the above has described various exemplary slot schemes and the description below referring to FIGS. 5-7 will describe these slot schemes in more detail. However, it has not yet been described when to select one or more of the exemplary schemes for use. The exemplary reasons or criteria to select any one of these schemes will be described in greater detail below.

Figure 5:
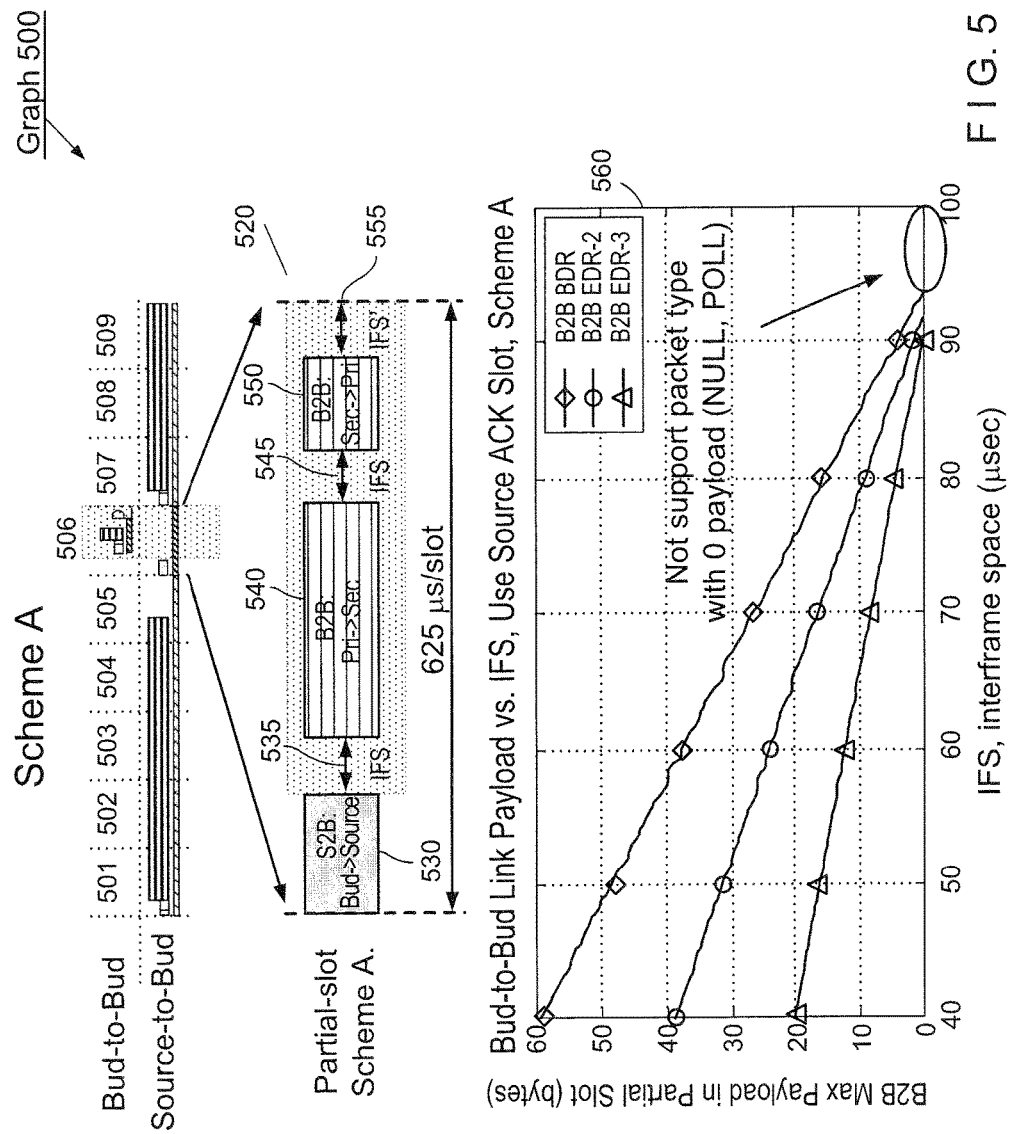
FIG. 5 shows the transmission graph for an example of a Partial-slot Scheme, as well as the impact on the IFS, according to various embodiments described herein.

FIG. 5 shows the transmission graph 500 for the Partial-slot Scheme A as well as an impact graph 560 on the IFS according to the exemplary embodiments described herein. In this example, it may be considered that the transmission graph 500 shows nine (9) slots 501-509 in the S2B piconet 102 schedule. For the purposes of this example, it may be considered that the slots 501-505 and 507-509 are being used for S2B piconet 102 communications and there is no available time in these slots for any B2B piconet 104 communications. However, the slot 506 may be considered to have available time that may be used for B2B piconet 104 communications. For example, the slot 506 may be the slot in the S2B piconet 102 schedule that is used for an acknowledgement ("ACK") that is sent from the slave (primary audio bud 108) to the master (source 106). This ACK may take up little time of the slot 506 such that the remaining time of the slot 506 may be used for the B2B piconet 104 communications, specifically using the Partial-slot Scheme A.

This is shown in more detail in the exploded view 520 of the slot 506. In this example, the slot 520 may be a 625 µs time slot. However, it is noted that the slot 506 having a length of 625 µs is only exemplary and other slot lengths may be used and may depend on the type of communication scheme being used for the piconet. The first portion of the slot 506 is used for the S2B communication 530 (e.g., the ACK transmitted from the primary audio bud 108 to the source 106). However, the remainder of the slot 506 is available for B2B piconet 104 communications. It is noted that since the primary audio bud 108 is a member of the S2B piconet 102 and the secondary audio bud 110 eavesdrops on the S2B piconet 102, each of these devices may understand the schedule for the S2B piconet 102 and may understand that there is available time in the slot 506 for the B2B piconet 104 communications.

Thus, after the S2B communication 530, the primary audio bud 108 and the secondary audio bud 110 may tune to the B2B piconet 104 (and take any other steps to prepare for communication via the B2B piconet 104) during the IFS 535. After IFS 535, the primary audio bud 108 may transmit a B2B communication 540 to the secondary audio bud 110. At the completion of the B2B communication 540, there is another IFS 545 where the primary audio bud 108 and the secondary audio bud 110 switch between the respective transmission and reception modes. After IFS 545, the secondary audio bud 110 may transmit a B2B communication 550 to the primary audio bud 108. At the completion of the B2B communication 550, there is another IFS 555 where the primary audio bud 108 and the secondary audio bud 110 may tune to the S2B piconet 102 to prepare to receive the transmissions scheduled for the slot 507.

As can be seen from this example, the Partial-slot Scheme A allows a complete round (poll/response) of B2B piconet communications (e.g., B2B communications 540 and 550) within the slot 506. Referring back to the graph 500, it can be seen that this scheme prevents any scheduling conflicts between the S2B piconet 102 and the B2B piconet 104 because the B2B piconet 104 communications (e.g., B2B communications 540 and 550) are limited to times when there are no scheduled S2B piconet 102 communications. This is generally made possible based on the fact that, as shown above in table 200, the B2B communications have a size that allows the communications to be inserted into the available time within the S2B piconet 102 slots without degradation in the performance of the B2B piconet 104. However, it is noted that there is no specific size requirement for the piconet communications to use the exemplary schemes described herein. Rather, the exemplary schemes may be used to avoid scheduling conflicts in the scatternet when the use of the schemes does not seriously degrade communications within any of the individual piconets.

The impact graph 560 illustrates the maximum supported B2B packet payload length for various transmission rates (e.g., basic date rate ("BDR"), enhanced data rate ("EDR")-2, EDR-3, etc.) versus IFS for the Partial-slot Scheme A. As can be seen from the graph 560, a shorter IFS may allow for higher B2B data transfers.

Figure 6:
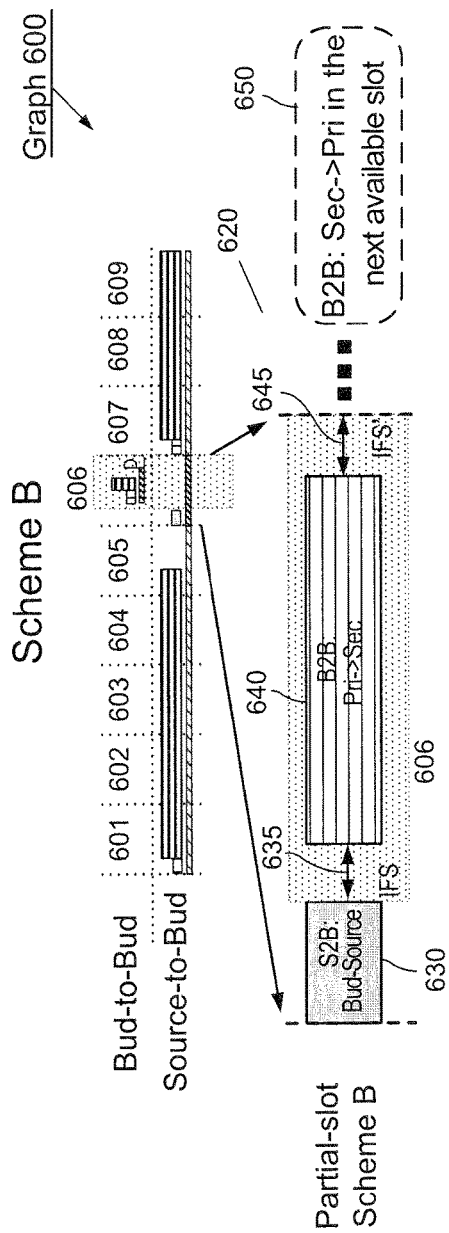
FIG. 6 shows the transmission graph for a further example of a Partial-slot Scheme, as well as the impact on the IFS, according to various embodiments described herein.
Figure 6:
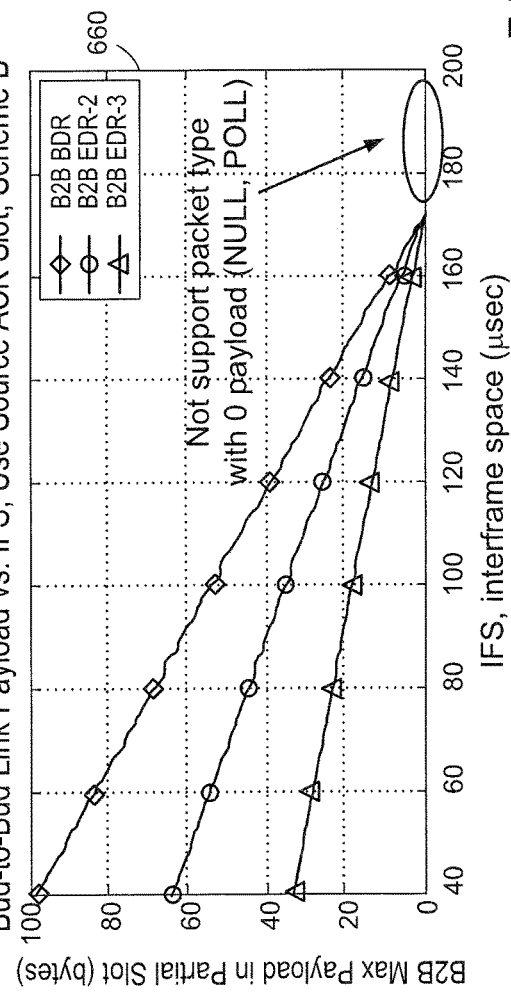

FIG. 6 shows the transmission graph 600 for a further example of a Partial-slot Scheme, as well as an impact graph 660 on the IFS, according to the exemplary embodiments described herein. Similar to the graph 500 of FIG. 5, the transmission graph 600 shows nine (9) slots 601-609 in the S2B piconet 102 schedule with the slots 601-605 and 607-609 being used for S2B piconet 102 communications. However, the slot 606 may be considered to have available time that may be used for B2B piconet 104 communications. Again, the slot 606 may be the slot in the S2B piconet 102 schedule that is used for the ACK that is sent from the slave (primary audio bud 108) to the master (source 106). This available time may be used for the B2B piconet 104 communications, specifically using the Partial-slot Scheme B. It should be noted that the slot 606 may also be used for other short S2B piconet 102 communications besides the ACK communication described above or the slot 606 may have no scheduled S2B piconet 102 communications, thereby leaving at least a portion of the slot 606 available for B2B piconet 104 communications.

This is shown in more detail in the exploded view 620 of the slot 606. The first portion of the slot 606 is used for the S2B communication 630 (e.g., the ACK transmitted from the primary audio bud 108 to the source 106). However, the remainder of the slot 606 is available for B2B piconet 104 communications. Similar to the description above, the primary audio bud 108 and the secondary audio bud 110 may understand the schedule for the S2B piconet 102 and may understand that there is available time in the slot 606 for the B2B piconet 104 communications.

Thus, after the S2B communication 630 and the IFS 635, the primary audio bud 108 may transmit a B2B communication 640 to the secondary audio bud 110. At the completion of the B2B communication 640, there is another IFS 645 where the primary audio bud 108 and the secondary audio bud 110 may tune to the S2B piconet 102 to prepare to receive the transmissions scheduled for the slot 607.

As can be seen from this example, the Partial-slot Scheme B allows a single B2B piconet communication (e.g., B2B communication 640) within the slot 606. In this example, the single B2B communication 640 may be considered a poll that is transmitted from the master (primary audio bud 108) to the slave (secondary audio bud 110). However, the single B2B communication may also be a response, e.g., a communication from the slave to the master. Thus, in this example, the primary audio bud 108 has transmitted a poll and will be expecting a response to that poll from the secondary audio bud 110. This response is illustrated in FIG. 6 as the B2B communication 650 that is not shown as occurring within the slot 606. Specifically, in Partial-slot Scheme B, the B2B communication 650 will occur in a later slot when the later slot has available time for the B2B communication 650. In this example, this later slot is some slot after slot 609 that is not illustrated in FIG. 6. However, it is possible that the next slot that has available time may be any slot that occurs after the slot 606. In this manner, the complete communication (poll/response) between the primary audio bud 108 and the secondary audio bud 110 may be accomplished. It is noted that the reason for splitting the poll/response in the manner proposed by Partial-slot Scheme B is that the two B2B communications (including the required IFSs) may not fit in the remaining available time after the S2B communication 630 in the slot 606.

Referring back to the graph 600, it can be seen that this scheme also prevents any scheduling conflicts between the S2B piconet 102 and the B2B piconet 104 because the B2B piconet 104 communication (e.g., B2B communication 640) is limited to times when there are no scheduled S2B piconet 102 communications.

Similar to FIG. 5, the impact graph 660 illustrates the maximum supported B2B packet payload length for various transmission rates (e.g., BDR, EDR-2, EDR-3, etc.) versus IFS for the Partial-slot Scheme B. Once again, a shorter IFS may allow for higher B2B data transfers.

Figure 7:
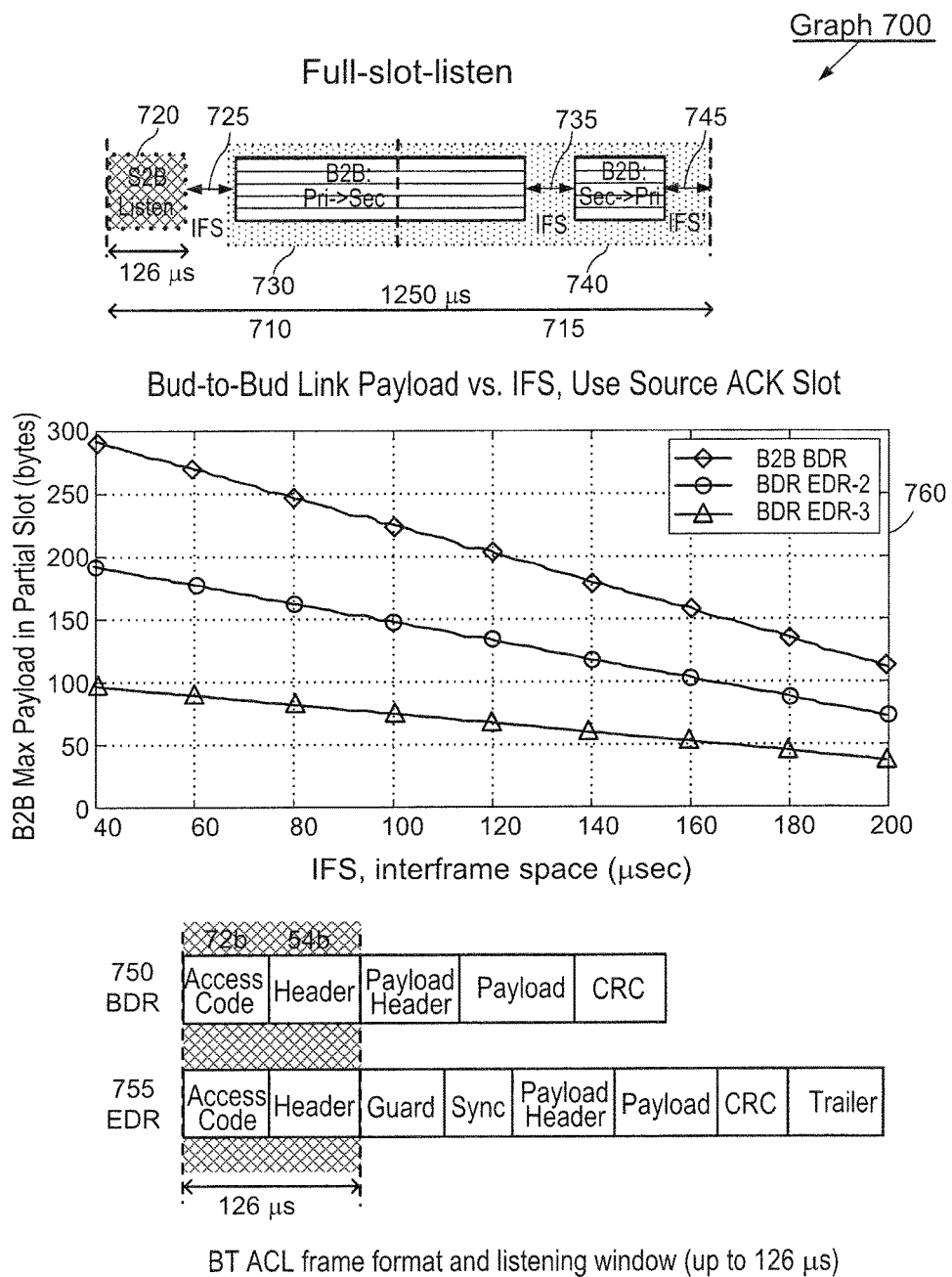
FIG. 7 shows the transmission graph for an example of a Full-slot-listen Scheme, as well as the impact on the IFS, according to various embodiments described herein.

FIG. 7 shows the transmission graph 700 for an example of a Full-slot-listen Scheme, as well as an impact graph 760 on the IFS, according to the exemplary embodiments described herein. Prior to describing the transmission graph 700, FIG. 7 also shows two exemplary Bluetooth Asynchronous Connection-Less ("BT ACL") frame formats for the S2B communications, a BDR frame format 750 and an EDR frame format 755. It can be seen that each of these frame formats 750 and 755 include an access code and header portion. One skilled in the art would understand that the access code identifies packets exchanged on a physical channel. Thus, packets sent in the same physical channel may be preceded by the same access code. Furthermore, the packet header contains information indicating a destination slave for an exemplary packet in a master-to-slave transmission slot. The header may also indicate the source slave for a slave-to-master transmission slot.

The components of the B2B piconet 104 (e.g., the primary audio bud 108 and the secondary audio bud 110) may listen to the communications of the S2B piconet 102, including the access code and header portions, to determine whether the full slot will be available for B2B transmissions. That is, the contents of these two fields of the frame formats 750 and 755 will indicate to the primary audio bud 108 and the secondary audio bud 110 whether the S2B piconet 102 will be using the remainder of the slot. As shown in FIG. 7, the access code and header portions of the frame formats may have a length of 126 μs. Thus, if the remainder of the slot is available, the remaining time will be the length of the slot minus 126 μs. According to one embodiment, the availability may be determined based on information included in the access code and header. Alternatively, the availability may be determined based on the lack of an access code and/or header transmitted in the first portion of the slot.

For instance, if there is no energy detected by the slot start nominal time plus jitter requirement time (e.g., 10 μs), then the remaining slot time (e.g., 615 μs=625 μs−10 μs) and the next full slot (e.g., 625 μs) may be available. Alternatively, if there is energy detected, then the access code and header portion may be considered. Specifically, slot time may be available if the detected access code is not matched (e.g., the packet is not sent to the source piconet), or if the access code is matched but not the packet header (e.g., the packet is sent to the source piconet but not to the intended receiver). The remaining slot time may be based on the full slot (625 μs) less the current decision time taken from the slot start. Accordingly, this remaining slot time and the next full slot (625 μs) may be available. However, if the packet is addressed to the intended receiver, then the remaining slot time less the decision time and the next full slot may not be available for use.

The transmission graph 700 shows two slots 710 and 715. In this example, each slot is 625 μs for a total length of 1250 μs for the two slots 710 and 715. It is noted that in this example, two slots 710 and 715 are shown because the slots are arranged in an even/odd arrangement meaning that if there is no payload scheduled for transmission in the S2B piconet 102 in the even slot (e.g., slot 710) there will also be no transmission scheduled for the next odd slot (e.g., slot 715). For example, if no poll is sent, a corresponding response also will not be sent. Thus, once the primary audio bud 108 and the secondary audio bud 110 determine that the remainder of slot 710 is available, this will also mean that the entire slot 715 will also be available. Thus, in this example, the primary audio bud 108 and the secondary audio bud 110 will listen 720 for the first 126 μs of the slot 710. If it is determined that there is no S2B communication scheduled for the remainder of the slot 710, the primary audio bud 108 and the secondary audio bud 110 will understand that the remainder of slot 710 (e.g., 625 μs−126 μs) and the entire slot 715 (e.g., 625 μs) will be available for the B2B communications. This description will continue as if this is the case, e.g. the remainder of slot 710 and the slot 715 are available for the B2B communications.

After the listen period 720, there will be an IFS 725 when the primary audio bud 108 and the secondary audio bud 110 may tune to the B2B piconet 104 (and take any other steps to prepare for communication via the B2B piconet 104). After IFS 725, the primary audio bud 108 may transmit a B2B communication 730 to the secondary audio bud 110. The B2B communication 730 may be the poll, e.g., the transmission from the master (primary audio bud 108) to the slave (secondary audio bud 110). In this example, the B2B communication 730 is shown as using the remainder of the slot 710 and extending into slot 715. This may be the case, but it also may be the case that the B2B communication 730 is completed prior to the end of the slot 710. The point being that the complete poll may be transmitted even if it is longer than the remainder of the slot 710.

At the completion of the B2B communication 730, there is another IFS 735 where the primary audio bud 108 and the secondary audio bud 110 switch between the respective transmission and reception modes. After IFS 735, the secondary audio bud 110 may transmit the response B2B communication 740 to the primary audio bud 108. At the completion of the B2B communication 740, there is another IFS 745 where the primary audio bud 108 and the secondary audio bud 110 may tune to the S2B piconet 102 to prepare for the transmissions scheduled for the next slot.

As can be seen from this example, the Full-slot-listen Scheme allows a complete round (poll/response) of B2B piconet communications (e.g., B2B communications 730 and 740) within the slots 710 and 715 that are not being used by the S2B communications. Thus, in a similar manner to the Partial-slot schemes, this scheme also prevents any scheduling conflicts between the S2B piconet 102 and the B2B piconet 104 because the B2B piconet 104 communications (e.g., B2B communications 730 and 740) are limited to times when there are no scheduled S2B piconet 102 communications. However, this Full-slot-listen Scheme also allows for a B2B communication to extend beyond the current slot. In contrast, in each of the Partial-slot schemes, the B2B communications that are started in a slot are completed prior to the end of that slot.

The impact graph 760 illustrates the maximum supported B2B packet payload length for various transmission rates (e.g., BDR, EDR-2, EDR-3, etc.) versus IFS for the Full-slot-listen Scheme. Unlike the impact graphs for the Partial-slot schemes, the impact graph 760 does not converge to zero (0) because, as described above, the B2B communications are allowed to extend beyond the current slot.

Figure 8:
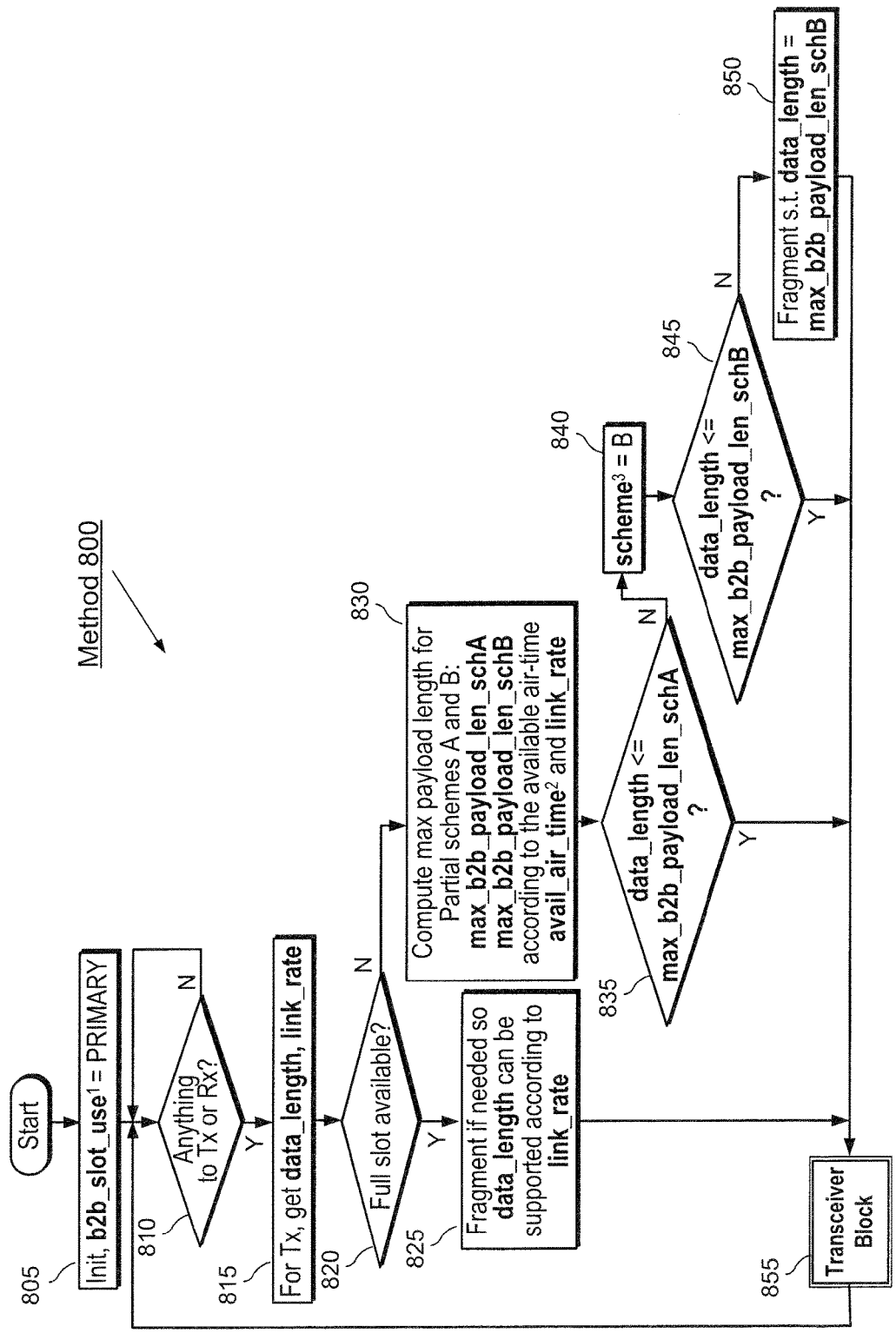
FIG. 8 shows an exemplary method for mitigating scheduling conflicts in wireless communication devices according to various embodiments described herein.

FIG. 8 shows an exemplary method 800 for mitigating scheduling conflicts in wireless communication devices according to various embodiments described herein. The method 800 will be described with reference to the scatternet 100 including the S2B piconet 102 having the source 106 (master) and the primary audio bud 108 (slave) and the B2B piconet 104 having the primary audio bud 108 (master) and the secondary audio bud 110 (slave). Each of the primary audio bud 108 and the secondary audio bud 110 may perform the operations of method 800.

In 805, the initial B2B transmission slot use is set to "Primary." In other words, the primary audio bud 108 may be designated to use the B2B slot. In 810, it may be determined whether there is any data to transfer or receive. This refers to data that is to be exchanged over the B2B piconet 104. If there is no data to transmit or receive, the method 800 may loop until there is data to transmit or receive. If there is data to transmit or receive, the method 800 may advance to 815.

In 815, information regarding the data length and the link rate for transmission may be received. This information may be used later in the method as will be described in greater detail below. In 820, it may be determined whether a full slot is available in the S2B communication. The manners of determining whether a full slot is available were described above with reference to FIG. 7. Thus, in this example, the Full-slot-listen Scheme takes priority, e.g., if it is possible to use the full slot scheme, this scheme will be used. If a full slot is available, the method 800 may advance to 825 to determine if fragmentation is required. Specifically, in 825 the transmission may be fragmented so that the data length can be supported according to the link rate. For example, referring to FIG. 7, even though the B2B communication may take up the remainder of slot 710 and the complete slot 715, the amount of data that is to be transmitted, based upon the link rate of the B2B piconet 104, may take more time than is provided in slots 710 and 715. In this case, the data will be fragmented such that only the amount of data that can be transmitted in the time of slots 710 and 715 will be used. The remaining data will be transmitted at some later available time. After fragmentation in 825 (if used), the method 800 may advance to the transceiver block 855. The operations associated with the transceiver block 855 will be described in greater detail below with respect to FIG. 9.

However, if a full slot is not available in 820, the method 800 may advance to 830. In 830, the maximum payload may be calculated for each of the partial-slot schemes (e.g., Scheme A or Scheme B). Specifically, the maximum payload for B2B transmissions may be based on the available air-time (e.g., the remaining time in the current slot less any required IFS time) and the link rate information retrieved in 815. For Scheme A, the maximum payload will consider both the poll and response since both communications will be sent in the available time in the current slot if Scheme A is ultimately used. For Scheme B, only the poll will be considered in the maximum payload determination because it will be considered that only the poll will be sent in the available time in the current slot.

Upon calculating the maximum payload length for both Partial-slot Scheme A and Partial-slot Scheme B, in 835 the data length retrieved in 815 may be compared to the maximum payload length for Partial-slot Scheme A. If the data length is less than or equal to the maximum payload length determined for Partial-slot Scheme A, the method 800 may advance to the transceiver block 855. However, if the data length is greater than the maximum payload length determined for Partial-slot Scheme A, the method 800 may advance to 840.

In 840, the scheme may be designated as the Partial-slot Scheme B. That is, since the data length is greater than the maximum length allowed for Scheme A, Scheme B will be used. In 845, the data length retrieved in 815 may be compared to the maximum payload length for Partial-slot Scheme B. If the data length is less than or equal to the maximum payload length determined for Partial-slot Scheme B, the method 800 may advance to the transceiver block 855. However, if the data length is greater than the maximum payload length for Partial-slot Scheme B, the method 800 may advance to 850. In 850, the space time ("s.t.") of the transmission data may be fragmented such that the data length is equal to the maximum payload length for Partial-slot Scheme B. The fragmenting may be similar to that described above with reference to 825. For example, even though Partial-slot Scheme B is selected, the data length for the poll transmission may exceed the maximum payload length. Thus, the payload will be fragmented such that the payload may be transmitted in the current time slot. Upon fragmenting the transmission in 850, the method 800 may advance to the transceiver block 855.

Figure 9:
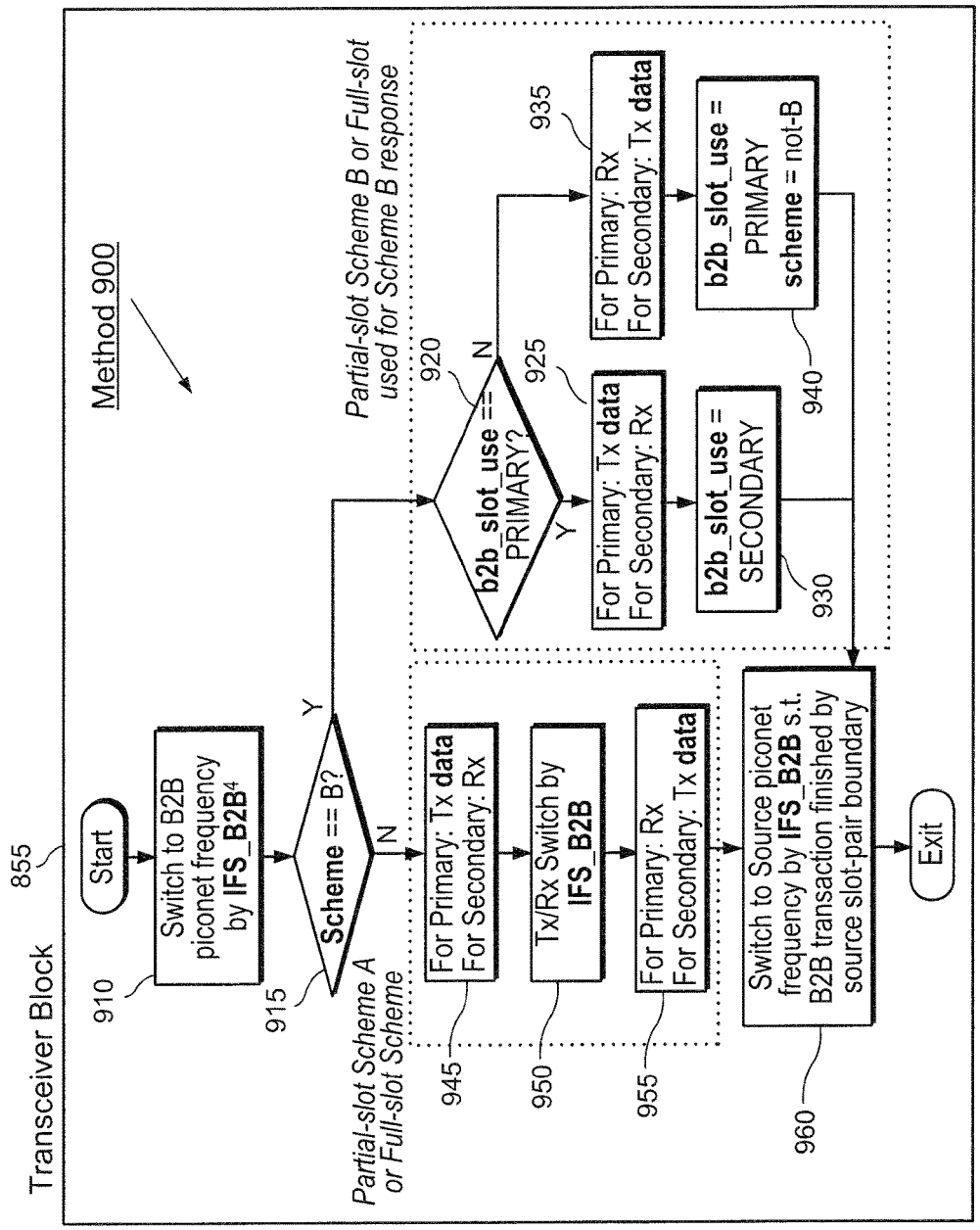
FIG. 9 shows an exemplary method for mitigating scheduling conflicts in wireless communication devices according to various embodiments described herein.

FIG. 9 shows an exemplary method 900 for mitigating scheduling conflicts in wireless communication devices based on different schemes described herein. Specifically, method 900 may represent the operations of the transceiver block 855 of method 800 in FIG. 8. More specifically, the method 900 may represent the operations of the hardware transceiver devices in the primary audio bud 108 and the secondary audio bud 110.

In 910, the transceivers of the devices of the B2B piconet 104 (e.g., the primary audio bud 108 and the secondary audio bud 110) may switch to a B2B piconet frequency. This operation may correspond to the IFS 535, 635 and 725 of FIGS. 5-7, respectively. In 915, it may be determined whether the scheme has been designated as the Partial-slot Scheme B. If the B2B communications is not using Scheme B, the method 900 may advance to 945 for Partial-slot Scheme A and Full-slot-listen Scheme operations. In 945, it is presumed that the scheme is either Partial-slot Scheme A or Full-slot-listen Scheme (e.g., not B). In 945, the primary audio bud 108 may transmit data while the secondary audio bud 110 may receive data. For example, if Partial-slot Scheme A is currently being used, the primary audio bud 108 will transmit the B2B communication 540 of FIG. 5 and the secondary audio bud 110 will receive the B2B communication 540 during 945. If the Full-slot-listen Scheme is currently being used, the primary audio bud 108 will transmit the B2B communication 730 of FIG. 7 and the secondary audio bud 110 will receive the B2B communication 730 during 945.

In 950, the transceivers of the primary audio bud 108 and the secondary audio bud 110 may switch their corresponding operating mode (e.g., the primary audio bud 108 transceiver from transmission mode to reception mode and the secondary audio bud 110 transceiver from reception mode to transmission mode). This operation may correspond to the IFS 545 and 735 of FIGS. 5 and 7, respectively. Following the switch, in 955 the primary audio bud 108 may receive data while the secondary audio bud 110 may transmit data. For example, if Partial-slot Scheme A is currently being used, the secondary audio bud 110 will transmit the B2B communication 550 of FIG. 5 and the primary audio bud 108 will receive the B2B communication 550 during 955. If the Full-slot-listen Scheme is currently being used, the secondary audio bud 110 will transmit the B2B communication 740 of FIG. 7 and the primary audio bud 108 will receive the B2B communication 740 during 945. When this is complete, the method 900 will advance to 960 that will be described in greater detail below.

Returning to 915, if the B2B communication is using Scheme B, the method 900 may advance to 920. In 920, it may be determined whether the B2B slot use is by the primary audio bud 108. As described with reference to 805 of method 800, the B2B slot use is initialized to the primary audio bud 108. If the B2B slot is currently set to the primary audio bud 108, in 925 the primary audio bud 108 may transmit data while the secondary audio bud 110 may receive data. For example, the primary audio bud 108 will transmit the B2B communication 640 of FIG. 6 and the secondary audio bud 110 will receive the B2B communication 640 during 925. Following 925, the B2B slot use may be set to the secondary audio bud 110 in 930 and the method 900 may advance to 960 that will be described in greater detail below.

If it is determined in 920 that the B2B slot use is not by the primary audio bud 108, in 935 the primary audio bud 108 may receive data while the secondary audio bud 110 may transmit data. For example, the secondary audio bud 110 will transmit the B2B communication 650 of FIG. 6 and the primary audio bud 108 will receive the B2B communication 650 during 935. Following 935, the B2B slot use may be set to the primary audio bud 108 in 940 and the scheme may be designated as "not B." Furthermore, the method 900 may advance to 960.

Thus, after one of operations 930, 940 or 955, the method 900 advances to 960 where the transceivers of the devices of the B2B piconet 104 (e.g., the primary audio bud 108 and the secondary audio bud 110) may switch to a S2B piconet frequency. This operation may correspond to the IFS 555, 645 and 745 of FIGS. 5-7, respectively.

It should be noted that after step 960 is completed, referring back to FIG. 8, the method 800 will return to 810 to determine if there is any data to be transmitted or received. More specifically, upon completing the method 900 as described in the transceiver block 855 of FIG. 9, the operations of the method 800 may restart at step 810 with a possible change in conditions (e.g., B2B slot use flag, scheme flag, etc.). For instance, as noted above, the B2B slot use may be set to "Primary" at 805 upon an initial operation of method 800. However, this condition may change from "Primary" to "Secondary" when the method 800 reaches 855 and, subsequently reaches 930 in method 900. Such a change in this condition will change the operation of the transceiver 855 (specifically, at 920) upon the next iteration of method 800. Additionally, the scheme may be set to "Scheme B" at 840 upon comparing the data length to a maximum payload data length. However, this condition may change from "Scheme B" to "Scheme not-B" when the method 800 reaches 855 and, subsequently reaches 940 in method 900. Such a change in this condition will change the operation of the transceiver 855 (specifically, at 915) upon the next iteration of method 800.

Figure 10:
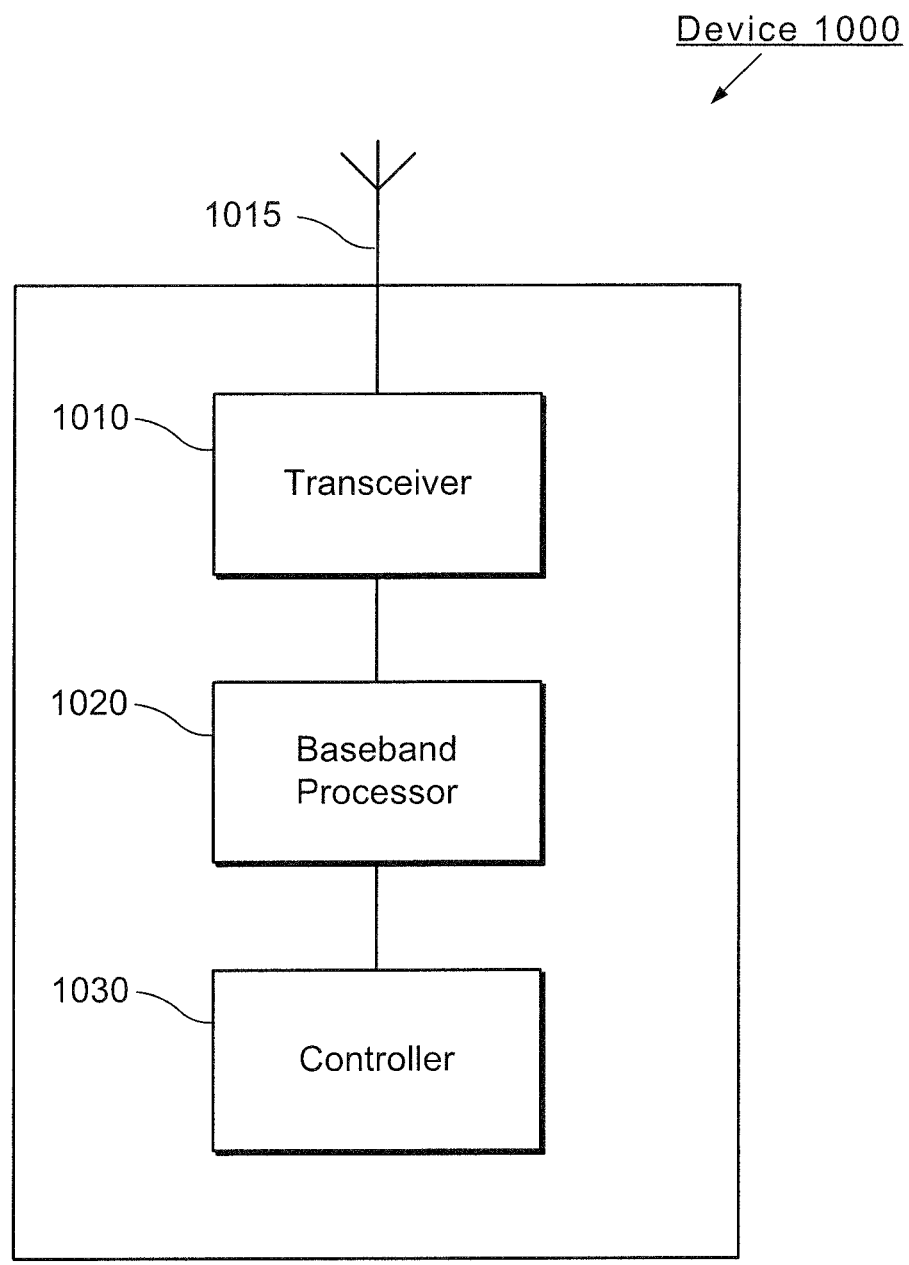
FIG. 10 shows an exemplary device (e.g., wireless audio buds) for mitigating scheduling conflicts in wireless communication devices according to various embodiments described herein.

FIG. 10 shows an exemplary device 1000 (e.g., wireless audio buds) for mitigating scheduling conflicts in wireless communication devices according to various embodiments described herein. The device 1000 may represent any electronic device (e.g., primary audio bud 108) that is configured to perform wireless functionalities, such as but not limited to communicating with a master device (e.g., the source device 106) as well as a slave device (e.g., the secondary audio bud 110). However, it is noted that the device 1000 may also represent the other components of the exemplary scatternet, such as the source device 106 and the secondary audio bud 110.

Furthermore, it is noted that the device 1000 is not limited to audio buds and may represent any portable wireless device, such as, but not limited to a wearable computing device, a mobile phone, a tablet computer, a personal computer, a VoIP telephone, an Internet of Things (IoT) device, etc. The device 1000 may also be a client stationary device such as a desktop terminal.

The exemplary device 1000 may include a transceiver 1010 connected to an antenna 1015, a baseband processor 1020 and a controller 1030, as well as other components. The other components may include, for example, a memory, a battery, ports to electrically connect the device 1000 to other electronic devices, etc. The controller 1030 may control the communication functions of the transceiver 1010 and the baseband processor 1020. In addition, the controller 1030 may also control non-communication function related to the other components, such as the memory, the battery, etc.

According to one embodiment, the baseband processor 1020 may be a chip compatible with a wireless communication standard, such as Bluetooth. The baseband processor 1020 may be configured to execute a plurality of applications of the device 1000. For example, the applications may include the above-referenced methods related to the exemplary embodiments, such as but not limited to, the selection and implementation of the Partial-slot Schemes A and B and/or the Full-slot-listen Scheme as described in method 800 FIG. 8. Additionally, the transceiver 1010 may also be configured to execute a plurality of applications of the device 1000. For example, the applications may include the above-referenced methods related to the exemplary embodiments, such as but not limited to, the selection and implementation of the Partial-slot Schemes A and B and/or the Full-slot-listen Scheme as described in method 900 FIG. 9. It should also be noted that the baseband processor 1020, the controller 103 and the transceiver 1010 may include circuitry (with or without firmware) to perform the functionalities described herein. That is, the functionalities described herein are not required to be implemented as applications, but may also be implemented as chip level or board level integrated circuits.

Finally, in the above examples, various transmission schemes including slots, lengths of the slots and transmission formats have been described. It should be understood that these are all exemplary and those skilled in the art will understand that using the principles described herein for the full and partial slot schemes may be applied to different transmission schemes to accomplish scheduling coordination for different piconets.

Real-time Relay of Wireless Communications

Figure 11:
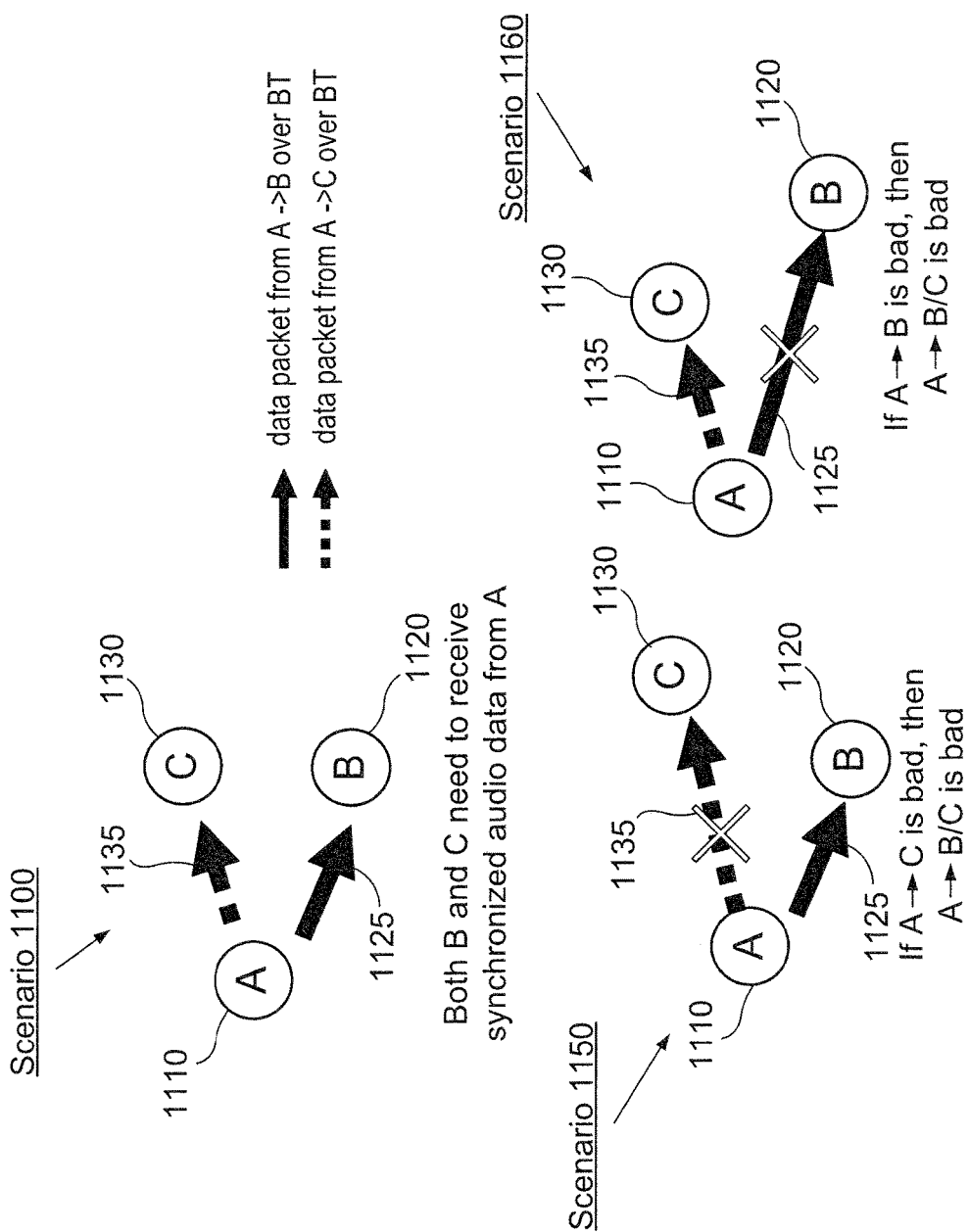
FIG. 11 shows an exemplary source device communicating with two unwired audio buds over a short-ranged wireless network, such as a Bluetooth network, according to various embodiments described herein.

In an exemplary piconet scenario 1100 depicted in FIG. 11, a source device A 1110 may communicate with two unwired audio buds (e.g., a first wireless audio bud B 1120 for the right ear and a second wireless audio bud C 1130 for the left ear) over a short-ranged wireless network, such as a Bluetooth network.

In this scenario, the source device A 1110 acts as the master while each of the wireless audio buds B 1120 and C 1130 act as the slaves or "audio sinks." One skilled in the art would understand that an audio sink may be defined as a device that acts as a sink of a digital audio stream delivered from a source over a shared piconet. More specifically, the source device A 1110 may communicate with the wireless audio bud B 1120 via Bluetooth link 1125, represented by the solid line in FIG. 11, for transmitting data packets from A->B over a shared S2B piconet. Likewise, the source device A 1110 may communicate with the wireless audio bud C 1130 via Bluetooth link 1135, represented by the dashed line in FIG. 11, for transmitting data packets from A->C over a shared S2B piconet.

Furthermore, each of the wireless audio buds B 1120 and C 1130 may receive ("Rx") synchronized data from the source device A 1110 within limited time intervals. Without such synchronization, the user of the source device A 1110 and wireless audio buds B 1120 and C 1130 may experience audio glitches, wherein one of the audio buds receives the data packet(s) while the other audio bud does not. For instance, in scenario 1150, the A->B Bluetooth link 1125 may be operational while the A->C Bluetooth link 1135 may not be available or may not be functioning properly due to poor radio frequency, interference, fading, etc. Alternatively, in scenario 1160, the A->C Bluetooth link 1135 may be operational while the A->B Bluetooth link 1125 may be unavailable. In either of the depicted scenarios 1150 or 1160, the audio quality and range of the piconet is limited by the weaker of the two links, namely the A->B link 1125 and the A->C link 1135. This may cause a poor user experience for the user of the wireless audio buds 1120, 1130.

Figure 12:
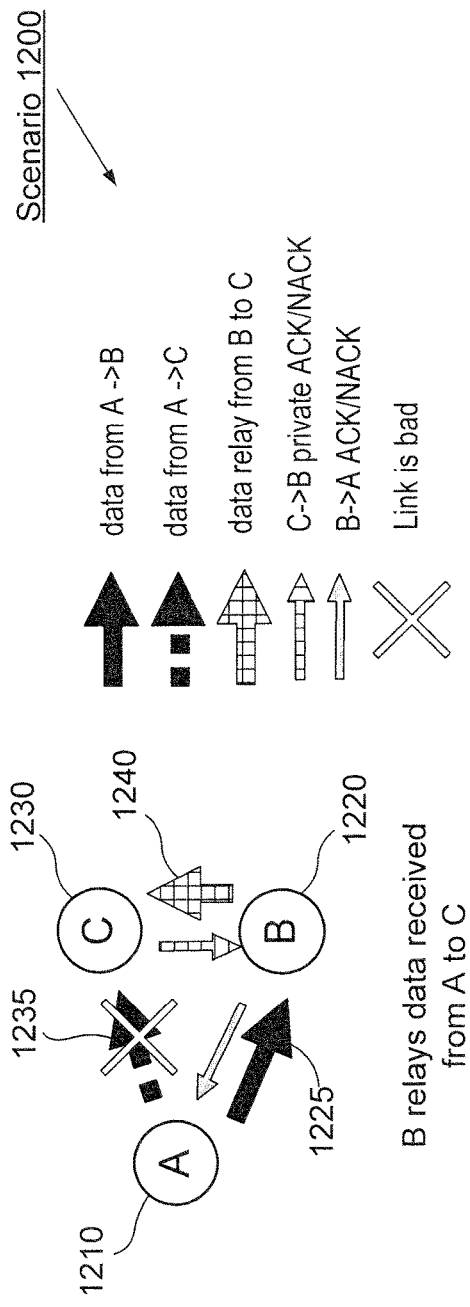
FIG. 12 shows a further exemplary source device communicating with two unwired audio buds over a short-ranged wireless network, such as a Bluetooth network, according to various embodiments described herein.
Figure 12:
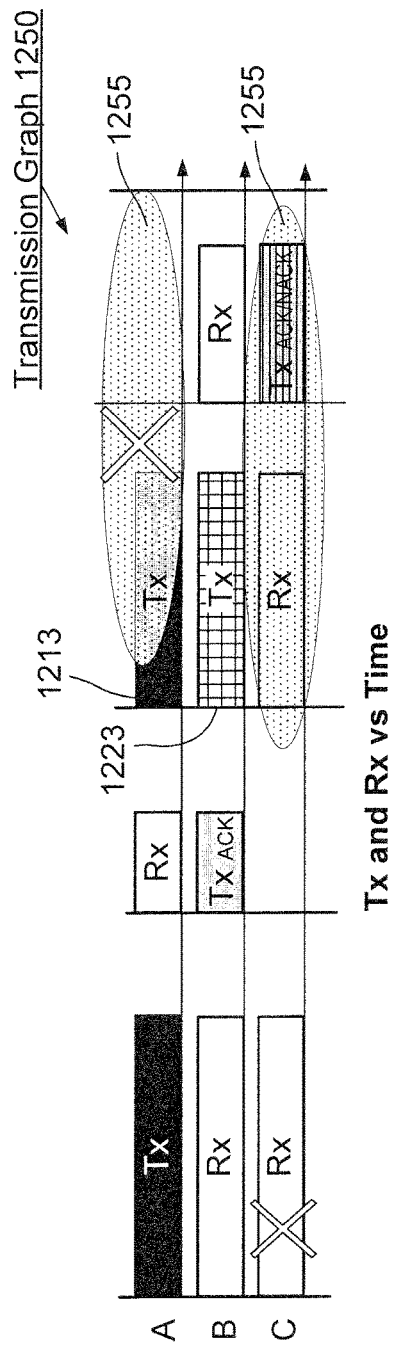

In a further exemplary scatternet scenario 1200 depicted in FIG. 12, a source device A 1210 may communicate with two wireless audio buds B 1220 and C 1230 over a Bluetooth network. Specifically, an A->B link 1225 may be established between the source device A 1210 and the wireless audio bud B 1220 and an A->C link 1235 may be established between the source device A 1210 and the wireless audio bud C 1230. Furthermore, both of the wireless audio buds 1220 and 1230 may form a private B2B piconet 1240 for relaying data packets, wherein the wireless audio bud B 1220 is the master and the wireless audio bud C 1230 is the slave.

Accordingly, if the audio bud B 1220 receives data packets from the source device A 1210 and the audio bud C 1230 does not, then the audio bud B 1220 may relay source data packets to the audio bud C 1230 after the audio bud B 1220 acknowledges ("ACK") to source device A 1210 that the packets were delivered. For example, the audio bud B 1220 may relay data received from source device A 1210 to the audio bud C 1230. The audio bud C 1230 may privately acknowledge or not acknowledge (ACK/NACK) receipt of the data relay to the audio bud B 1220 over the B2B piconet 1240.

However, as indicated in transmission graph 1250, during a source device A 1210 transmission (Tx) within this scatternet scenario 1200, a relay delivery over the B2B piconet 1240 is not guaranteed after the relaying node audio bud B 1220 ACKs to source device A 1210. For instance, there may be a scheduling conflict 1255 between B->C link transmission 1223 and A->B link transmission 1213. The B->C relay transmission 1223 may occupy the A<->B link 1213, thereby making the A<->B link 1213 not usable during the B2B piconet transmissions between the audio buds B 1220 and C 1230. Thus, the delivery of the source device A 1210 data to the audio bud C 1230 via the audio bud B 1220 is not guaranteed after the audio bud B 1220 acknowledges receipt of data to the source device A 1210.

According to the exemplary systems and methods described herein, a real-time relay scheme may form a private piconet between multiple sink devices. This private piconet may allow for a source data packet received from one sink device to be relayed to one or more other sink devices that were unable to receive the packet. For instance, the relay source data packet may be transmitted over the B2B piconet using the remaining time in the source transmission slot ("Tx slot") using any of the various transmission schemes described above (e.g., Partial-slot Scheme A, Partial-slot Scheme B, Full-slot-listen Scheme, etc.). It is noted that the exemplary embodiments for providing real-time relaying of wireless communications may implement any of the above-reference systems and methods for mitigating scheduling conflicts in wireless communication devices within a scatternet. In other words, the exemplary embodiments explore usable S2B partial and/or full slot(s) without conflicting with the source device, such that the relay transmission does not occupy source link bandwidth. Furthermore, the ACK message to the source device may be transmitted in a following source reception slot ("Rx slot") and thus guarantee that all of the sink devices receive the source data packets in a timely manner.

It is noted that one or more quality measures or characteristics of the B2B link between the sink devices may be better than those of the S2B links between the source device and the sink devices. This may be due to any number of factors, such as the sink devices remaining in close proximity to one another with minimal (or reduced) relative movement, while the source device may be further away with varying distance to one or more of the sink devices. When the B2B link is better than one or more of the S2B links, shorter data packets with a high rate of transmission may be used to relay the same amount of source payload between the sink devices. Depending on the source data packet size and frame length, the sink device may negotiate with the source device to ensure that the source device provides enough remaining time in the same source Tx slot for real-time relay. Thus, as opposed to any Bluetooth relay methods that may impact the source link and not guarantee relay deliveries, the exemplary embodiments described herein may have minimal or no impact on the S2B source link and receipt of the ACK from one of the sinks at the source device is a guarantee that both sinks have received delivery of the source packet.

The benefits of the exemplary systems and methods described herein include improvements in quality of service ("QoS") such as audio quality, improvements in range, a reduction in the network bandwidth and power consumption, reduced retransmissions and thus, improvements in co-located radio coexistence (e.g., multiple 2.4 GHz radio device may be located in close proximity with minimal interference, etc.).

It is noted that while the exemplary embodiments described herein may refer to the use of two wireless audio buds in communication with a source device, the systems and methods may be applied to any number of wireless devices using various applications, such as, but not limited to Bluetooth audio earphones, wireless speakers, range extenders, routers and other networking equipment, time-sensitive wireless applications, Internet of Things ("IoT") applications, fitness/medical devices, sensors, etc.

According to one exemplary embodiment, the wireless audio sinks may determine which sink should be designated as the primary and which sink(s) should be designated as the secondary. Specifically, the wireless audio buds may negotiate with each other and select the audio bud having the best source reception based on any number of factors, such as, but not limited to, a Received Signal Strength Indication ("RSSI"), a packet error rate ("PER"), etc., as the primary. The primary sink may be responsible for transmitting ACK/NACK messages to the source device, as well as negotiating with the source device. The remaining sink(s) may become secondary sink(s) and may not directly interact with the source device, except for passively listening (e.g., "eavesdropping") and receiving packets from the source device to the primary wireless audio bud. The source device may not be aware of the existence of the secondary sink(s) because it may have no direct data exchange with the secondary sink(s).

Figure 13:
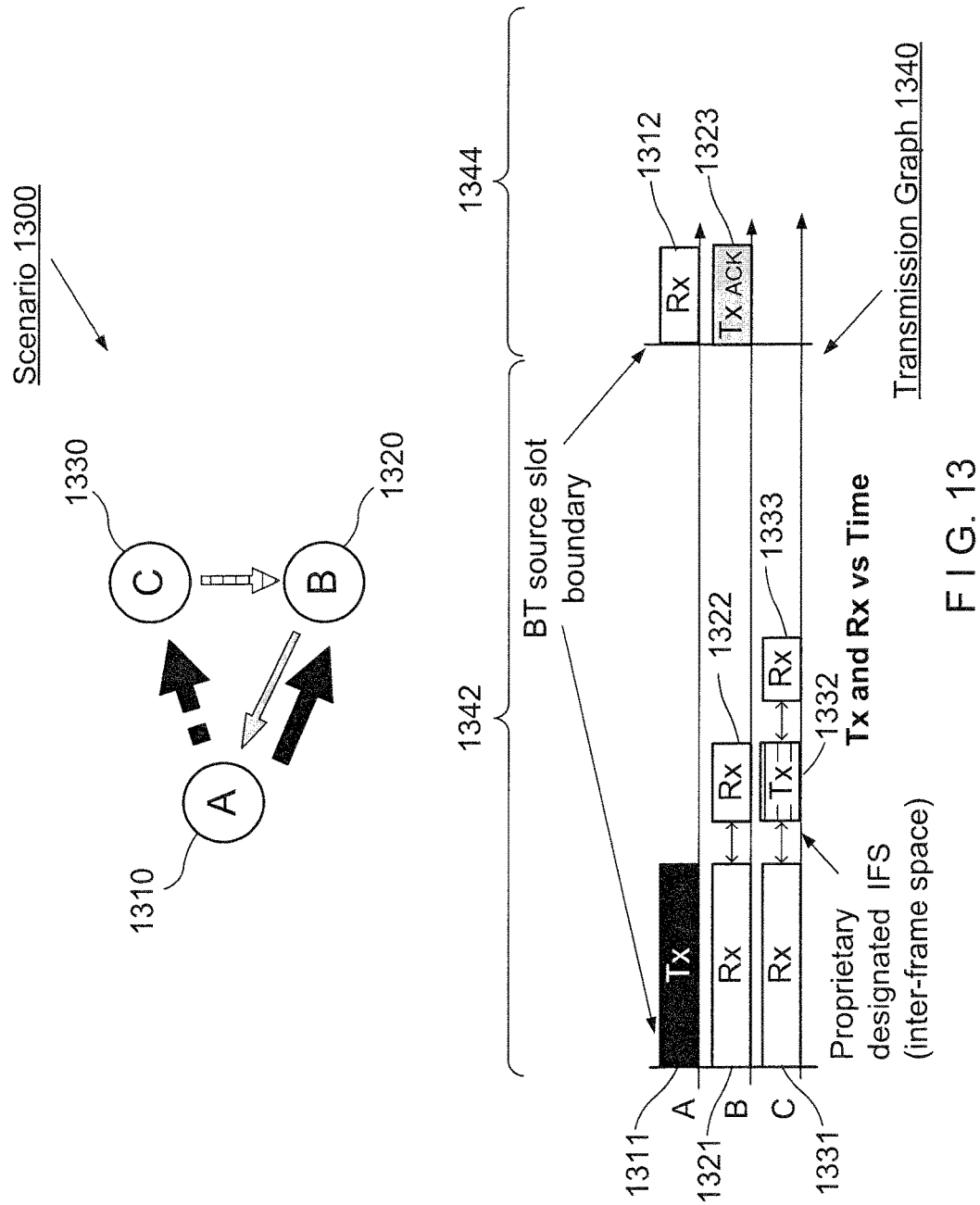
FIGS. 13-16 show various exemplary circumstances in which data transmissions occur and fail to occur between a source device A and the two audio buds B and C according to various embodiments described herein.
Figure 14:
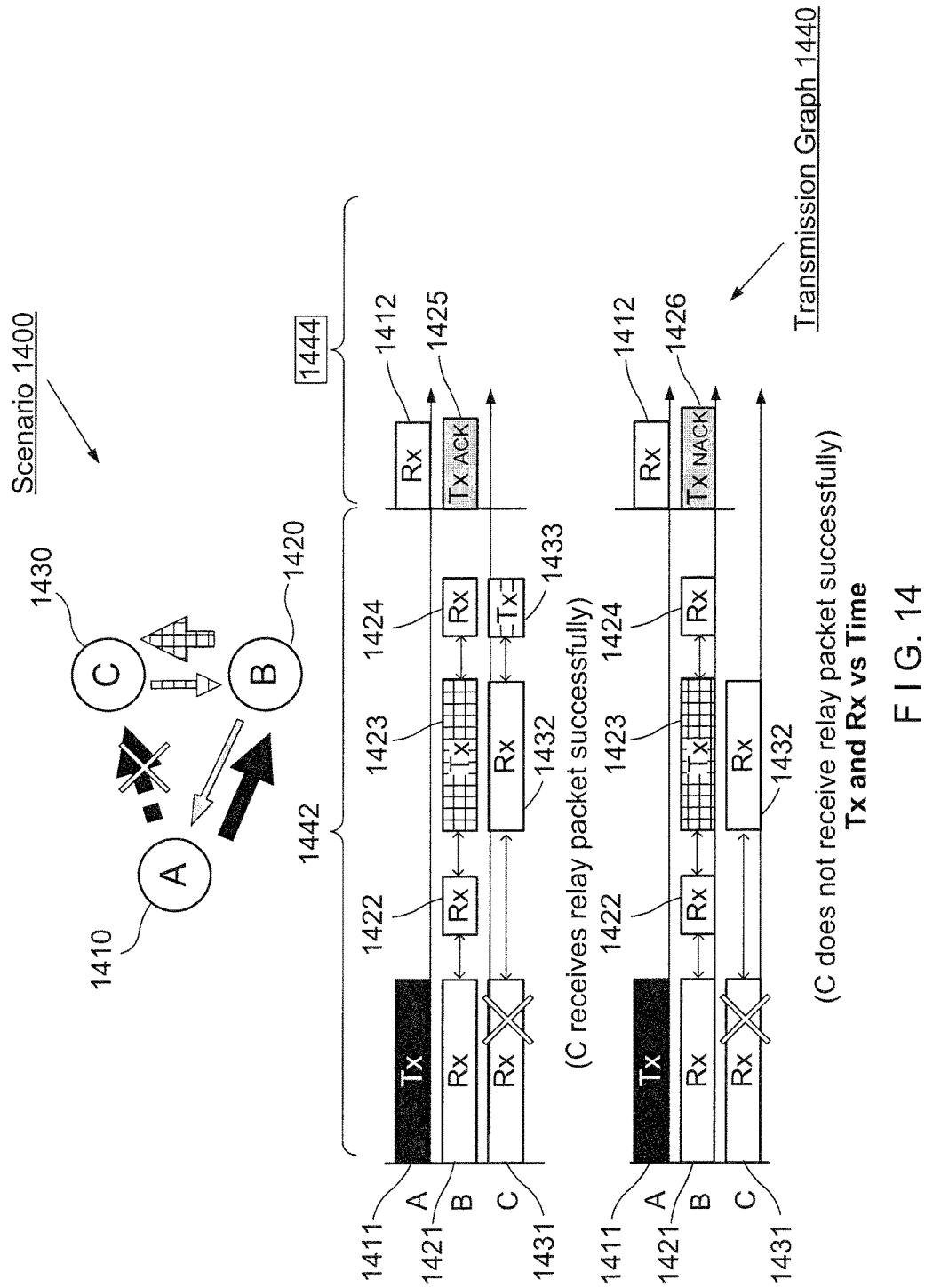
Figure 15:
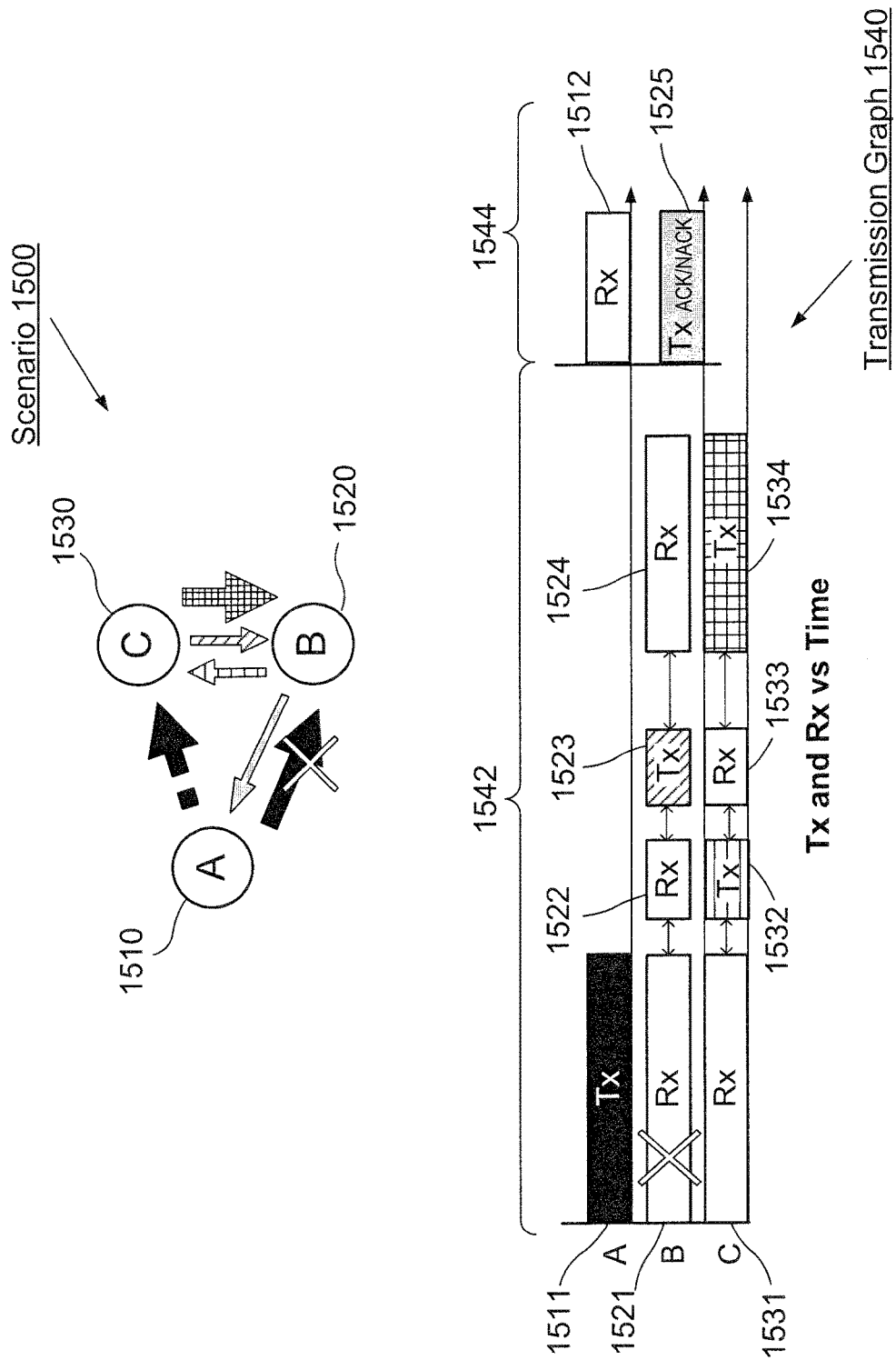
Figure 16:
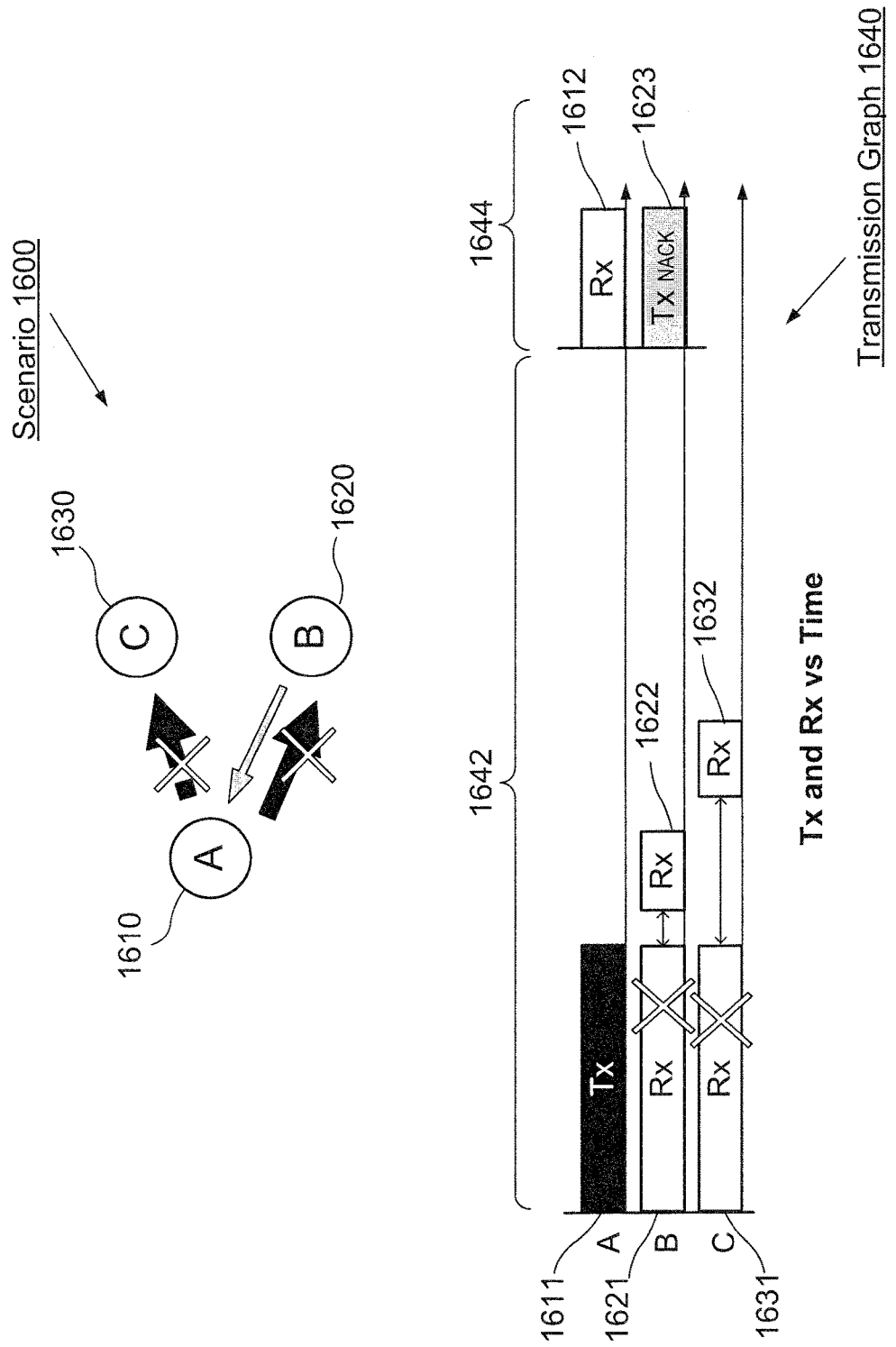

In various exemplary scatternet scenarios depicted in FIGS. 13-16, a source device A 1310, 1410, 1510, 1610 may communicate with wireless audio bud B 1320, 1420, 1520, 1620 and wireless audio bud C 1330, 1430, 1530, 1630 over a piconet network (e.g., using Bluetooth). As described above, the source device A may only have a master/slave relationship in an S2B piconet with one of the audio buds, while the other audio bud is a slave in a B2B piconet with the audio bud in the S2B piconet. FIGS. 13-16 may represent the various circumstances in which data transmissions occur and fail to occur between a source device A and the two audio buds B and C. For instance, FIG. 13 depicts a scenario 1300 in which both wireless audio buds B 1320 and C 1330 successfully receive a source packet from the source device A 1310. FIG. 14 depicts a scenario 1400 in which audio bud C 1430 has a bad link with the source device A 1410 and only audio bud B 1420 successfully receives a source packet from the source device A 1410. FIG. 15 depicts a scenario 1500 in which audio bud B 1520 has a bad link with the source device A 1510 and only audio bud C 1530 successfully receives a source packet from the source device A 1510. Finally, FIG. 16 depicts a scenario 1600 in which both audio buds B 1620 and C 1630 have bad links with the source device A 1610 and neither receive a source packet from the source device A 1610. Each of these exemplary scenarios will be described in greater detail below.

Furthermore, FIGS. 13-16 each include transmission graphs 1340, 1440, 1540 and 1640, respectively, each having multiple slots for transmission and reception over time. For instance, transmission graph 1340 may include a slot 1342 for S2B transmission communication (e.g., a Tx slot) from source device A to the audio buds B 1320 and C 1330, and a slot 1344 for S2B reception of communication (e.g., a Rx slot) from the audio buds B 1320 and C 1330 to source device A. Likewise, transmission graphs 1440, 1540 and 1640 may include TX slots 1442, 1542 and 1642, respectively, and Rx slots 1444, 1544 and 1644, respectively. It is noted that the Tx slots and the Rx slot may be described from the perspective of the exemplary source device A 1310 acting as a master to one of the slave devices (e.g., primary audio bud). Accordingly, the source device A 1310 may transmit the source packet within the Tx slot 1342 and may receive a transmission (e.g., an ACK or NACK) within the Rx slot 1344.

In each of the scenarios described with reference to FIGS. 13-16, it will be considered that the source device A and the audio bud B have formed the S2B piconet (e.g., the source device A is the master and the audio bud B is the slave). It will further be considered that the audio bud B and the audio bud C have formed the B2B piconet (e.g., audio bud B is the master and audio bud C is the slave). However, it should be understood that the S2B piconet may be formed between the source device A and the audio bud C, and that the master/slave relationship in the B2B piconet may be reversed. In addition, in this exemplary arrangement, when it is described that the source device A is transmitting data to the audio bud C or that the audio bud C is receiving data from the source device A, it should be understood that since the audio bud C is not a member of the S2B piconet, the source device A is not directly transmitting data to the audio bud C, but rather audio bud C is eavesdropping on the S2B communications in a manner that was previously described.

In FIG. 13, both of the wireless audio buds B 1320 and C 1330 receive the source packet from the source device A 1310, and thus, there is no need to relay the source packet between the audio buds B 1320 and C 1330. In this scenario 1300, both audio buds B 1320 and C 1330 may tune to the S2B piconet during the source Tx slot 1342 and listen/receive a source packet Tx 1311 that is transmitted from the source device A 1310 to audio bud B 1320. Specifically, both audio bud B 1320 and C 1330 may have available Rx times, 1321 and 1331, respectively, to listen/receive the Tx packet 1311. As noted above, the audio bud C 1330 may be aware of and receive the source packet Tx 1311 by eavesdropping on the source device A 1310.

If the audio bud C 1330 successfully receives the source packet 1311, the audio bud C 1330 may send a short private Tx ACK 1332 via the B2B piconet to the audio bud B 1320 immediately following the A->B transmission. That is, after receiving the source packet 1311, the audio buds 1320 and 1330 may tune to the B2B piconet during the Tx slot 1342 to perform various communications between the audio buds 1320 and 1330. It is noted that in between each of the transmissions and receptions throughout this scenario, interframe spaces ("IFSs") may be used to coordinate communications as previously described above. The audio bud B 1320 may have an available Rx time 1322 to listen/receive the ACK Tx packet 1332. After sending the private Tx ACK 1332, the audio bud C 1330 may then listen for a short period in Rx time 1333 for any potential C->B relay requests from the audio bud B 1320. The audio buds 1320 and 1330 may then tune back to the S2B piconet and in the following Rx slot 1344. The audio bud B 1320 may send a Tx ACK 1323 to source device A 1310 if the audio bud B 1320 successfully received the source TX packet 1311 and successfully received the private Tx ACK 1332 from the audio bud C 1330. Otherwise, the audio bud B 1320 may transmit a NACK (Tx NACK) to the source device 1310 during the Rx slot 1344. Accordingly, the source device A 1310 may have an available listen/receiver time 1312 for such ACK/NACK communications from the audio bud B 1320.

In FIG. 14, only the wireless audio bud B 1420 received the source packet 1411 from the source device A 1410 while the audio bud C 1430 failed to receive the source packet 1411 from the source device A 1410 (e.g., due to a bad link). In this scenario 1400, both audio buds B 1420 and C 1430 may tune to the S2B piconet during the source Tx slot 1442 and listen/receive a Tx source packet 1411, however the audio bud B 1420 during Rx time 1421 successfully receives the packet 1411 while the audio bud C 1430 during Rx time 1431 fails to receive the packet 1411. Similar to the scenario in FIG. 13, after the Rx times 1421 and 1431, the audio buds B 1420 and C 1430 may tune to the B2B piconet and the audio bud B 1420 may have an available Rx time 1422 to listen for the ACK Tx packet from the audio bud C 1430. Specifically, whenever the audio bud C 1430 successfully receives that source packet 1411, the audio bud C 1430 may send a short private Tx ACK to the audio bud B 1420 immediately following the A->B transmission. However, in this scenario, if the audio bud B 1420 does not receive the private ACK from audio bud C 1430 within the designated Rx time 1422 after the transmission of the Tx source packet 1411 from the source device A 1410, the audio bud B 1420 may presume that the audio bud C 1430 failed to receive the packet 1411. Accordingly, the audio bud B 1420 may relay the source packet 1411 during a B2B Tx 1423 to the audio bud C 1430.

According to one exemplary embodiment, for the relay transmission, the audio bud B 1420 may utilize a shorter data packet for the B2B Tx 1423, which may have a higher rate. For example, as described above, since the relationship between the audio buds 1420 and 1430 should be relatively stable (e.g., a relatively constant physical separation, similar interference sources, etc.), the B2B link between the audio buds 1420 and 1430 may support a higher data rate than the S2B link. Thus, the same amount of data may be transmitted in a shorter time over the B2B link than the amount of time it would take over the S2B link. However, it is noted that it is not required that the B2B link has a higher data rate than the S2B link.

Upon successfully receiving the relay B2B Tx 1423 during a listen/receive Rx time 1432, the audio bud C 1430 may respond with a private ACK Tx 1433. The audio bud B 1420 may listen/receive for the ACK Tx 1433 during Rx time 1424. If the audio bud B 1420 receives the ACK Tx 1433 during the Rx time 1424, the audio bud B 1420 may send a Tx ACK 1425 to the source device A 1410 during the next the Rx slot 1444 (after tuning back to the S2B piconet). Otherwise, if the audio bud C 1430 does not successfully receive the relay packet Tx 1423, the audio bud B 1420 may transmit a NACK (Tx NACK 1426) to the source device 1410 during the Rx slot 1444. Accordingly, the source device A 1410 may have an available listen/receiver time 1412 for such ACK/NACK communications from the audio bud B 1420.

In FIG. 15, only the wireless audio bud C 1530 successfully received the source packet from the source device A 1510 while the audio bud B 1520 failed to receive the packet from the source device A 1510 (e.g., due to a bad link). Once again, both audio buds B 1520 and C 1530 may tune to the S2B piconet during that source Tx slot 1542 and listen/receive a Tx source packet 1511, however the audio bud C 1530 during Rx time 1531 successfully receives the packet 1511 while the audio bud B 1520 during Rx time 1521 fails to receive the packet 1511. Similar to the scenarios discussed above, after the Rx times 1521 and 1531, the audio buds 1520 and 1530 may tune to the B2B piconet wherein the audio bud B 1520 may have an available Rx time 1522 to listen/receive an ACK Tx packet 1532 from the audio bud C 1530. If the audio bud B 1520 receives the ACK Tx packet 1532 without previously receiving the Tx source packet 1511, the audio bud B 1520 will be aware that a source packet transmission has been missed at the audio bud B 1520.

In this scenario 1500, the audio bud C 1530 successfully receives that source packet 1511 (S2B communication) and sends the short private Tx ACK 1532 (B2B communication) to the audio bud B 1520. However, since the audio bud B 1520 did not receive the referenced source packet transmission, the audio bud B 1520 may send a short private POLL packet 1523 to the audio bud C 1530 requesting a relay transmission of the packet 1511. After the audio bud C 1530 sends the ACK Tx packet 1532 to the audio bud B 1520, the audio bud C 1530 may listen for such a private POLL packet for a short period during the Rx time 1533. If the audio bud C 1530 receives the short private POLL Tx 1523 from the audio bud A 1520, then the audio bud C 1530 may relay the source packet 1511 to the audio bud B 1520 during a B2B Tx 1534.

Upon successfully receiving the relay B2B Tx 1534 during a listen/receive Rx 1524, the audio bud B 1520 may send a Tx ACK 1525 to the source device A 1510 at the next Rx slot 1544 in the S2B communication. Otherwise, if the audio bud B 1520 does not successfully receive the relay packet Tx 1534, the audio bud B 1520 may transmit a NACK (Tx NACK) to the source device 1510 during the Rx slot 1544. Accordingly, the source device A 1510 may have an available listen/receive time 1512 for such ACK/NACK communications from the audio bud B 1520.

In FIG. 16, neither of the wireless audio buds B 1620 nor C 1630 received the source packet 611 from the source device A 1610 (e.g., due to bad links). While both audio buds B 1620 and C 1630 may tune to the S2B piconet during the source Tx slot 1642 and listen for a Tx source packet 1611, both the audio bud 1620 and 1630 during Rx time 1621 and 1631, respectively, fail to receive the packet 1611. Once again, the audio bud B 1620 may have an available Rx time 1622 to listen for an ACK Tx packet from the audio bud C 1630. Likewise, the audio bud C 1630 may have an available Rx time 1632 to listen for a private POLL packet Tx from the audio bud B 1620. However, due to the S2B transmission failure at both the audio buds B 1620 and C 1630, neither of the audio buds 1620 or 1630 will receive any S2B or B2B transmissions. In other words, the audio bud B 1620 does not successfully receive the source data packet 1611 from the source device A 1610 nor any private ACK transmissions from the audio bud C 1630. In this scenario 1600, the audio bud B 1620 may transmit a NACK (Tx NACK) 1623 to the source device 1610 during the Rx slot 1644 of the S2B communication. Accordingly, the source device A 1610 may have an available listen/receive time 1612 for such ACK/NACK communications from the audio bud B 1620.

During each of the various scenarios depicted in FIGS. 13-16, additional embodiments may allow for the implementation of more aggressive relay schemes. For instance, these aggressive relay schemes may reduce or remove the private ACK and POLL overhead, and thus increase the maximum payload size for real-time relay transmissions. For example, whichever of the sink devices successfully receives the source packet may relay broadcast the source data immediately following the source Tx. Therefore, any sink devices that fail to receive the source packet may receive the packet from the relay broadcast opportunity.

With respect to the maximum supported source payload and feedback to the source device A, exemplary embodiments may allow for the determination of such payload size for real-time relay transmissions. FIG. 17 shows an exemplary table 1700 for real-time relay supported maximum Bluetooth source packet payload sizes based on link rates and slot length for the source Tx. It is noted that the exemplary table 1700 is for illustrative purposes for any of the various embodiments described herein and is not intended to limit the determination of payload size or feedback to any specific scheme or implementation. For example, a primary sink device B may transmit to a secondary sink device C a real-time relay having a payload of up to 365 bytes per Bluetooth packet using a transmission rate of 3 Mbps if the source device A uses 5 slots and a 2 Mbps transmission rate.

Furthermore, based on the source TX slot length and the supported link rates (e.g., S2B and B2B), the primary sink B may provide feedback to the source device A to limit the source packet frame length and/or request extended Tx slots for use during relay transmissions. For instance, the source packet frame length may be limited by reducing the source data amount (e.g., using a lower encoder rate), fragmentation with smaller packets, using higher transmission rates, etc. The source device A may reserve extended Tx slots (e.g., up to 5 slots) although source packets may occupy only, e.g., 1 or 3 slots. Accordingly, the remaining time in the Tx slot may be used for the real-time relay systems and methods described herein.

Figure 18:
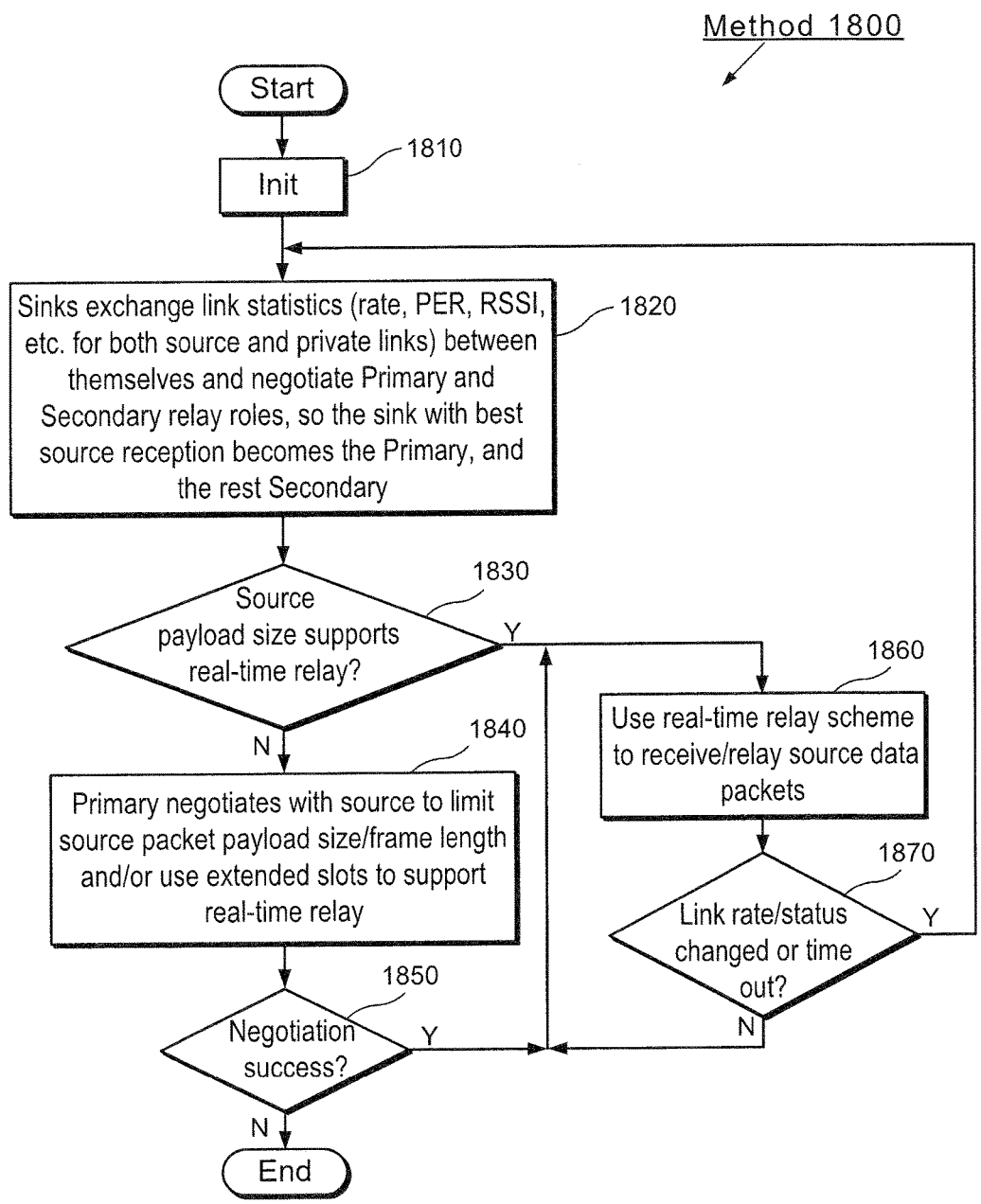
FIG. 18 shows an exemplary method for a providing real-time relay of wireless communications according to various embodiments described herein.

FIG. 18 shows an exemplary method 1800 for a providing real-time relay of wireless communications according to various embodiments described herein. The method 1800 will be described with reference to the scatternet including a first piconet having the source device (as a master) and a primary audio sink (as a slave) and a second piconet having the primary audio sink (as a master) and secondary audio sink (as a slave). Each of the primary audio sink and the secondary audio sink may perform the operations of method 1800. Furthermore, the source device may refer to any of the above-reference source devices A; the primary audio sink may refer to any of the above-referenced primary audio buds B; and the secondary audio sink may refer to any of the above-reference secondary audio buds C.

In 1810, each of the network components (e.g., source device and sink devices) may be configured for wireless communications. This configuration may include, for example, establishing transmission slots and reception slots for S2B and B2B communications. In 1820, a primary relay role may be designated for one of the sink devices. For instance, each of the sink devices may exchange link statistics, such as any/all of a rate, RSSI, PER, etc., for either or both the S2B piconet links and the B2B piconet links. Based on the statistical information exchange, the sink devices may negotiate the primary and secondary relay roles such that the sink having the best source reception may become the primary sink device. The remaining sink device(s) may then be designated as the secondary sink device(s).

In 1830, it may be determined whether the source payload size of a source Tx packet will support a real-time relay. Specifically, the table 1700 may be utilized as a look-up table based on the various parameters of the source device transmission. If the source payload size supports real-time relay, the method 1800 may advance to 1860. If the source payload size does not support real-time relay transmissions, the method 1800 may advance to 1840.

In 1840, the primary sink device may negotiate with the source device to enable the transmission to allow for real-time relays. For instance, the primary sink device may request that the source device limit the source packet payload size and/or frame length. Additionally or alternatively, the primary sink device may request that the source device use extended slots to support real-time relaying.

In 1850, it may be determined whether the negotiations between the primary sink device and the source device were successful. If the negotiations were not successful, the method 1800 may terminate. If the negotiations were successful, the method 1800 may advance to 1860 (or to 1830 for re-evaluation).

In 1860, the primary sink device may implement any of the various real-time relay schemes to receive and/or relay source data packets to/from the secondary sink device(s). As detailed above in FIGS. 13-16, various scenarios may include both the primary and secondary devices receiving the source packet, only one of the primary and secondary devices receiving the source packet, neither the primary nor the secondary devices receiving the source packet, etc.

In 1870, it may be determined whether any of the S2B transmission parameters have changed or timed out. For instance, the change in parameters may include a change in the link rate or status. Such a change or a transmission time out may require any subsequent transmissions to be evaluated for the capability to support real-time relay transmissions. Accordingly, if there is a change in the link rate/status or a time out, the method 1800 may loop back to 1820 wherein the primary and secondary roles may be reassessed and possibly re-designated. If there were no changes to the link, the method 1800 may loop back to 1860, wherein the real-time relay schemes may continue to be implemented during future S2B transmissions.

It will be apparent to those skilled in the art that various modifications may be made in the present disclosure, without departing from the spirit or scope of the disclosure. Thus, it is intended that the present disclosure cover the modifications and variations of this disclosure provided they come within the scope of the appended claims and their equivalents.

What is claimed is:

1. A method comprising:
at a first wireless audio output device configured as a slave to a source device in a first piconet and configured as a master to a second wireless audio output device in a second piconet:
receiving a message indicating that an audio packet transmitted by the source device via the first piconet was received by the second wireless audio output device;
determining whether the message was received at the first wireless audio output device within a first predetermined time period after the source device transmitted the audio packet; and
determining that the first wireless audio output device did not receive the audio packet from the source device based on at least receiving the message from the second wireless audio output device within the first predetermined time period.

2. The method of claim 1, further comprising:
transmitting, via the second piconet, a poll packet to the second wireless audio output device, the poll packet including a request for the audio packet.

3. The method of claim 2, further comprising:
receiving, via the second piconet, the audio packet from the second wireless audio output device.

4. The method of claim 3, further comprising:
transmitting, via the first piconet, an acknowledgement (ACK) message to the source device based on receiving the audio packet from the second wireless audio output device.

5. The method of claim 2, further comprising:
determining whether the first wireless audio output device received the audio packet from the second wireless audio output device within a second predetermined time period after the first wireless audio output device transmitted the poll packet.

6. The method of claim 5, wherein, when the first wireless audio output device does not receive the audio packet within the second predetermined time period, transmitting, via the first piconet, a negative acknowledgement (NACK) message to the source device.

7. A first wireless audio output device, comprising:
a transceiver configured to connect as a slave with a source device in a first piconet and connect as a master with a second wireless audio output device in a second piconet; and
a processor communicatively coupled to the transceiver and configured to:
receive a message indicating that the second wireless audio output device has received an audio packet from the source device;
determine whether the message was received at the first wireless audio output device within a predetermined time period after the source device transmitted the audio packet; and
determine that the first wireless audio output device did not receive the audio packet based on at least receiving the message from the second wireless audio output device within the predetermined time period.

8. The first wireless audio output device of claim 7, wherein,
the transceiver transmits, via the second piconet, a poll packet to the second wireless audio output device, the poll packet including a request for the audio packet, and
the transceiver receives, via the second piconet, the audio packet from the second wireless audio output device.

9. The first wireless audio output device of claim 7, wherein the transceiver transmits, to the source device via the first piconet, a request to adjust a value of at least one transmission parameter for the transmission of the audio packet via the first piconet, wherein the at least one transmission parameter comprises a transmission slot length, a transmission rate, a packet payload size, or a frame length.

10. A method, comprising:
at a first wireless audio output device configured as a slave to a source device in a first piconet and configured as a master to a second wireless audio output device in a second piconet:
receiving an audio packet transmitted by the source device via the first piconet;
transmitting the audio packet to the second wireless audio output device via the second piconet;
determining whether a message indicating that the second wireless audio output device has received the audio packet is received from the second wireless audio output device within a first predetermined time period after the first wireless audio output device transmits the audio packet; and
when the first wireless audio output device receives the message within the first predetermined time period, transmitting, via the first piconet, an acknowledgement (ACK) message to the source device, and when the first wireless audio output device does not receive the further acknowledgement message within the first predetermined time period, transmitting, via the first piconet, a negative acknowledgement (NACK) message to the source device.

11. The method of claim 10, wherein, transmitting the audio packet to the second wireless output device is based on at least listening to the second piconet for a further message from the second wireless audio output device within a second predetermined time period after the source device transmitted the audio packet and determining that the first wireless audio output device did not receive the further message from the second wireless audio output device via the second piconet within the second predetermined time period.

12. The method of claim 10, further comprising:
requesting the source device to adjust a value of at least one transmission parameter for the transmission of the audio packet via the first piconet.

13. The method of claim 12, wherein the at least one transmission parameter comprises a transmission slot length, a transmission rate, a packet payload size, or a frame length.

14. A system, comprising:
a first wireless audio output device; and
a second wireless audio output device,
wherein one of the first or second wireless audio output devices connects as a slave to a source device in a first piconet and connect as a master to an other one of the first or second audio output devices in a second piconet,
wherein, the first wireless audio output device and the second wireless audio output device tune to the first piconet during a first time period and tune to the second piconet during a second time period subsequent to the first time period,
wherein, during the second time period, the one of the first or second wireless audio output devices listens for a message indicating that the other one of the first or second wireless audio output devices received an audio packet from the source device during the first time period, and
wherein, when the one of the first or second wireless audio output devices does not receive the message during the second time period and receives the audio packet during the first time period, the one of the first or second wireless audio output devices determines that the other one of the first or second wireless audio output devices did not receive the audio packet during the first time period.

15. The system of claim 14, wherein the first wireless audio output device and the second wireless audio output device exchange one or more link statistics to determine which one of the first wireless audio output device or the second wireless audio output device to connect as the slave to the source device in the first piconet and the master in the second piconet.

16. The system of claim 15, wherein the one or more link statistics comprise at least one of link statistics for: a connection between the first and second wireless audio output devices, a connection between the first wireless audio output device and the source device, or a connection between the second wireless audio output device and the source device,
wherein the link statistics represent at least one of a throughput rate, a Received Signal Strength Indication ("RSSI"), or a packet error rate ("PER").

17. The system of claim 14,
wherein, when the one of the first or second wireless audio output devices receives the message during the second time period and does not receive the audio packet during the first time period, the one of the first or second wireless audio output devices transmits, via the second piconet, a poll packet to the other one of the first or second wireless audio output device, the poll packet including a request for the audio packet, and
wherein, the other one of the first or second wireless audio output devices transmits, via the second piconet, the audio packet to the one of the first or second wireless audio output device based on at least receiving the poll packet.

18. The method of claim 14, wherein the one of the first or second wireless audio output devices transmits the audio packet to the other one of the first or second wireless audio output device based on receiving the audio packet from the source device.

19. The method of claim 14, wherein the other one of the first or second wireless audio output devices transmits the audio packet to the one of the first or second wireless audio output device based on receiving the audio packet from the source device.

20. The method of claim 14, wherein, when the one of the first or second wireless audio output device does not receive the audio packet from the source device during the first time period and does not receive the message from the other one of the first or second wireless audio output device during the second time period the one of the first or second wireless audio output device transmits, via the first piconet, a negative acknowledgement (NACK) message to the source device.

* * * * *